(12) United States Patent
Rongley

(10) Patent No.: US 11,520,337 B2
(45) Date of Patent: Dec. 6, 2022

(54) MOBILE INVENTORY TRANSPORT UNIT AND AUTONOMOUS OPERATION OF MOBILE INVENTORY TRANSPORTATION UNIT NETWORKS

(71) Applicant: Autonomous Shelf, Inc., Denver, CO (US)

(72) Inventor: Eric Rongley, Golden, CO (US)

(73) Assignee: Autonomous Shelf, Inc., Denver, CO (US)

( * ) Notice: Subject to any disclaimer, the term of this patent is extended or adjusted under 35 U.S.C. 154(b) by 56 days.

(21) Appl. No.: 16/708,618

(22) Filed: Dec. 10, 2019

(65) Prior Publication Data
US 2020/0225665 A1 Jul. 16, 2020

Related U.S. Application Data

(60) Provisional application No. 62/778,131, filed on Dec. 11, 2018, provisional application No. 62/778,127, filed on Dec. 11, 2018.

(51) Int. Cl.
*G05D 1/02* (2020.01)
*B60L 50/50* (2019.01)
(Continued)

(52) U.S. Cl.
CPC ............ *G05D 1/0212* (2013.01); *B60L 8/003* (2013.01); *B60L 50/50* (2019.02); *G01S 19/426* (2013.01);
(Continued)

(58) Field of Classification Search
CPC .. G05D 1/0212; G05D 1/0231; G05D 1/0255; G05D 1/0257; G05D 1/0285;
(Continued)

(56) References Cited

U.S. PATENT DOCUMENTS

| 6,748,292 B2 | 6/2004 | Mountz |
| 6,950,722 B2 | 9/2005 | Mountz |

(Continued)

FOREIGN PATENT DOCUMENTS

| CA | 2936393 A1 | 1/2017 |
| CN | 203020893 U | 6/2013 |

(Continued)

OTHER PUBLICATIONS

Cast Engineering, Automated Load Measuring System (ALMS), 2016, fuelmonitoring.org (Year: 2016).*

(Continued)

*Primary Examiner* — Aniss Chad
*Assistant Examiner* — Chase L Cooley
(74) *Attorney, Agent, or Firm* — Neugeboren O'Dowd PC

(57) ABSTRACT

Systems, methods, computing platforms, and storage media for transporting a mobile inventory transportation unit (MITU) in a communication network are disclosed. Exemplary implementations may include the mobile inventory transportation communication network comprising the MITU, a transportation system, a first and a second central system, in communication with each other, the MITU comprising a housing, an inventory storage device, a power device, a drive device, a navigation device, a sensing device, and a control device. The transportation system may be configured to physically receive and transport the MITU from a first point to a second point, the second central system may be configured to determine an inventory demand at a second or more location and transmit inventory request data to the first central system, and the first central system may be configured to schedule the movement of the MITU and control the delivery of the MITU to a final destination.

28 Claims, 10 Drawing Sheets

(51) Int. Cl.
*B60L 8/00* (2006.01)
*G01S 19/42* (2010.01)
(52) U.S. Cl.
CPC ......... *G05D 1/0231* (2013.01); *G05D 1/0255* (2013.01); *G05D 1/0257* (2013.01); *G05D 1/0285* (2013.01); *G05D 2201/0216* (2013.01)
(58) Field of Classification Search
CPC . G05D 2201/0216; B60L 50/50; B60L 8/003; G01S 19/426; Y02T 10/7072; Y02T 10/70; B65G 1/1373; G06Q 50/30; G06Q 10/087
See application file for complete search history.

(56) References Cited

U.S. PATENT DOCUMENTS

| | | | |
|---|---|---|---|
| 7,243,001 B2 | 7/2007 | Janert et al. | |
| 7,402,018 B2 | 7/2008 | Mountz et al. | |
| 7,850,413 B2 | 12/2010 | Fontana | |
| 7,881,820 B2 | 2/2011 | Antony et al. | |
| 7,894,933 B2 | 2/2011 | Mountz et al. | |
| 7,912,574 B2 | 3/2011 | Wurman et al. | |
| 7,920,962 B2 | 4/2011 | D'Andrea et al. | |
| 8,086,344 B1 | 12/2011 | Mishra et al. | |
| 8,103,377 B1 | 1/2012 | Wong et al. | |
| 8,220,710 B2 | 7/2012 | Hoffman et al. | |
| 8,234,006 B1 | 7/2012 | Sachar et al. | |
| 8,239,291 B2 | 8/2012 | Hoffman et al. | |
| 8,265,873 B2 | 9/2012 | D'Andrea et al. | |
| 8,280,547 B2 | 10/2012 | D'Andrea et al. | |
| 8,306,650 B1 | 11/2012 | Antony et al. | |
| 8,326,452 B2 | 12/2012 | Somin et al. | |
| 8,433,437 B1 | 4/2013 | Shakes et al. | |
| 8,527,325 B1 | 9/2013 | Atreya et al. | |
| 8,594,834 B1 | 11/2013 | Clark et al. | |
| 8,606,392 B2 | 12/2013 | Wurman et al. | |
| 8,626,335 B2 | 1/2014 | Wurman et al. | |
| 8,639,382 B1 | 1/2014 | Clark et al. | |
| 8,718,814 B1 | 5/2014 | Clark et al. | |
| 8,798,784 B1 | 8/2014 | Clark et al. | |
| 8,798,786 B2 | 8/2014 | Wurman et al. | |
| 8,805,573 B2 | 8/2014 | Brunner et al. | |
| 8,805,574 B2 | 8/2014 | Stevens et al. | |
| 8,825,197 B1 | 9/2014 | Guan | |
| 8,831,984 B2 | 9/2014 | Hoffman et al. | |
| 8,892,240 B1 | 11/2014 | Vliet et al. | |
| 8,909,368 B2 | 12/2014 | D'Andrea et al. | |
| 8,930,133 B2 | 1/2015 | Wurman et al. | |
| 8,958,903 B1 | 2/2015 | Rotella et al. | |
| 8,965,562 B1 | 2/2015 | Wurman et al. | |
| 8,972,045 B1 | 3/2015 | Mountz et al. | |
| 9,008,827 B1 | 4/2015 | Dwarakanath et al. | |
| 9,008,829 B2 | 4/2015 | Worsley | |
| 9,656,805 B1 | 5/2017 | Evans et al. | |
| 9,916,562 B1 | 3/2018 | Armato | |
| 10,303,171 B1* | 5/2019 | Brady | G05D 1/0297 |
| 2007/0080000 A1* | 4/2007 | Tobey | A61G 5/045 180/21 |
| 2008/0040182 A1 | 2/2008 | Wegner et al. | |
| 2008/0167884 A1 | 7/2008 | Mountz et al. | |
| 2011/0103924 A1 | 5/2011 | Watt et al. | |
| 2011/0153063 A1 | 6/2011 | Wurman et al. | |
| 2013/0054005 A1 | 2/2013 | Stevens et al. | |
| 2013/0103552 A1 | 4/2013 | Hoffman et al. | |
| 2013/0173049 A1 | 7/2013 | Brunner et al. | |
| 2014/0195040 A1 | 7/2014 | Wurman et al. | |
| 2014/0350831 A1 | 11/2014 | Hoffman et al. | |
| 2015/0151912 A1* | 6/2015 | Mountz | G06Q 10/087 700/218 |
| 2015/0151913 A1 | 6/2015 | Wong et al. | |
| 2015/0202770 A1 | 7/2015 | Patron et al. | |
| 2015/0353280 A1 | 12/2015 | Brazeau et al. | |
| 2015/0353282 A1 | 12/2015 | Mansfield et al. | |
| 2016/0019497 A1 | 1/2016 | Carvajal | |
| 2016/0236867 A1 | 8/2016 | Brazeau et al. | |
| 2016/0292634 A1 | 10/2016 | Mehring et al. | |
| 2017/0088360 A1 | 3/2017 | Brazeau et al. | |
| 2017/0136931 A1 | 5/2017 | Colantonio et al. | |
| 2017/0161486 A1 | 6/2017 | Jeon et al. | |
| 2017/0217683 A1 | 8/2017 | Lyon et al. | |
| 2017/0293294 A1* | 10/2017 | Atchley | B62B 5/02 |
| 2018/0024554 A1* | 1/2018 | Brady | G06Q 10/0833 701/23 |
| 2018/0032949 A1 | 2/2018 | Galluzzo et al. | |
| 2018/0058739 A1 | 3/2018 | Zou | |
| 2018/0074504 A1 | 3/2018 | Shydo, Jr. | |
| 2018/0086353 A1 | 3/2018 | Holbrooke et al. | |
| 2018/0086561 A1 | 3/2018 | Stubbs et al. | |
| 2020/0065748 A1 | 2/2020 | Durkee et al. | |
| 2020/0122927 A1* | 4/2020 | Bellar | G05D 1/0297 |
| 2020/0364652 A1 | 11/2020 | Rongley | |
| 2020/0364653 A1 | 11/2020 | Rongley | |

FOREIGN PATENT DOCUMENTS

| | | |
|---|---|---|
| CN | 105314315 A1 | 12/2017 |
| EP | 1590272 B1 | 8/2010 |
| KR | 20190070700 A | 6/2019 |
| WO | 2007149194 A2 | 12/2007 |
| WO | 2007149703 A2 | 12/2007 |

OTHER PUBLICATIONS

Thomas, Shane, "International Search Report and Written Opion Regarding International Application No. PCT/US20/31634", dated Aug. 7, 2020, p. 9, Published in: US.

Young, Lee, "International Search Report and Written Opinion Regarding International Application No. PCT/US2019/65377", dated Mar. 30, 2020, p. 23, Published in: US.

Bruner, Nicole Elena, "Office Action Regarding U.S. Appl. No. 16/867,711", Apr. 1, 2021, p. 49, Published in: US.

Thomas, Shane, "International Search Report and Written Opinion Regarding International Application No. PCT/US21/21482", Jul. 19, 2021, p. 25, Published in: US.

* cited by examiner

MOBILE INVENTORY
TRANSPORT UNIT

MOBILE INVENTORY TRANSPORT UNIT AND AUTONOMOUS OPERATION OF MOBILE INVENTORY TRANSPORTATION UNIT NETWORKS

PRIORITY AND CROSS REFERENCE TO RELATED APPLICATIONS

The present Application for Patent claims priority to U.S. Provisional Application No. 62/778,127 and U.S. Provisional Application No. 62/778,131, both filed Dec. 11, 2018, and assigned to the assignee hereof. Both of these applications are hereby expressly incorporated by reference herein.

FIELD OF THE DISCLOSURE

The present invention relates to methods and apparatuses for material handling and transportation systems. More specifically, the present invention relates to automation of product transportation systems.

DESCRIPTION OF RELATED ART

The field of automation is rapidly expanding into non-traditional functions, for instance, within the inventory management systems industry. Automation has become common in numerous applications, including online retail (e.g., warehousing, manufacturing, etc.) and airport luggage handling. In some cases, automation creates distinct advantages including higher uptime and lower revolving costs over the traditional labor force. It is estimated that automation will continue to become more prevalent in performing traditional labor tasks in these, and additional industries in the future.

While automation contributes to lower costs and higher uptimes, the rigidity of current automation systems presents numerous problems. Inefficiencies, high capital cost, and inelasticity of current automation capabilities has prevented expansion into non-traditional applications. In some cases, technological challenges arise when an autonomous operation is required from the automation system in conjunction with additional tasks, such as when an autonomous response to inventory demands is needed along with the transportation of goods. In some aspects, current automation hardware is designed for limited functionally at a single geographic location. For example, current hardware design is limited to retrieval and delivery of separate product storage devices from a starting point to an end point within the single geographic site. The inability of current automation systems to adapt logistically to a second geographic site, particularly in response to the inventory demand at the second site, has prevented automation systems from expanding beyond their currently limited capabilities.

Thus, there is a need for a flexible and autonomous transportation system that can respond to inventory demands at more than one site. This may be accomplished by incorporating autonomous inventory movement and distribution apparatus' with transportation systems in conjunction with autonomous responses to independent inventory demands. In some cases, such a system may allow for an autonomous response to an auxiliary location's inventory demand.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some embodiments of the disclosure may be characterized as a mobile inventory transportation communication network. The network can include a mobile inventory transport unit (MITU), a transportation system, a first central system, and a second central system.

In some embodiments, the mobile inventory transportation communication network can include a mobile inventory transport unit (MITU). In some embodiments the MITU can include a housing. In some embodiments, the MITU can include an inventory storage device that is physically coupled to the housing. In some embodiments, the MITU can include a power device that is operationally configured to supply power to the electrical components of the mobile inventory transport unit and may be a battery cell, a fuel cell, or a solar cell source. In some embodiments, the MITU can include a drive device that is in electrical communication with the power device and is operationally configured to physically move the MITU from a first point to a second point. In some embodiments, the MITU can include a navigation device that is in electrical communication with the power device and is operationally configured to transmit and receive geographic data and determine the physical location of the MITU. In further embodiments, the method of transmitting and receiving data of the navigation device may be based at least in part on a GPS, Wi-Fi, or Cellular transmission. Additionally, or alternatively, the method of transmitting or receiving may be beacon based, for instance, to account for indoor use and localization functions based on technologies other than Wi-Fi.

In some embodiments, the MITU can include a sensing device that is in electrical communication with the power device and is operationally configured to detect physical objects and transmit and receive physical object data. In further embodiments, the method of detection of physical objects of the sensing may be Light Detection and Ranging (LIDAR), Radar, Laser, ultrasonic, visual or Infrared sensing. In some embodiments, the MITU can include a control device that is in electrical communication with the power device, the drive device, the navigation device, and the sensing device, and is operationally configured to control the mobile inventory transport unit and transmit and received data from physically separate systems. In further embodiments, the method of transmitting and receiving data of the control device may be Wi-Fi, cellular, near field communication, Bluetooth, or a combination thereof.

In some embodiments, the mobile inventory transportation communication network can include a transportation system. In some embodiments, the transportation system is operationally configured to transmit to and receive data from the MITU and other secondary systems, physically receive the MITU, and physically transport the MITU from a first point to a second point. In further embodiments, the transportation system may be a vehicle, such as an automobile, an aircraft, a train, a boat, a ship, etc.

In some embodiments, the mobile inventory transportation communication network can include a first central system. In some embodiments, the first central system is in communication with the control device of the MITU, transportation system, and the second central system, and is operationally configured to receive inventory request data from the second central system, transmit to and receive data from the second central system, transmit to and receive data from the mobile inventory transport unit, schedule the movement of the mobile inventory transport unit, transmit to and receive data from the transportation system, and control the delivery of the mobile inventory transport unit to a final destination. In further embodiments, the method of transmitting and receiving mobile inventory transport unit data, second central system data, and transportation system data of the first central system is may be Wi-Fi, cellular, or Bluetooth.

In some embodiments, the mobile inventory transportation communication network can include a second central system. In addition, the network may comprise a decentralized network that does not specifically require just one or two systems in communication, for example, a network where one transport unit communicates with many other units to determine an optimal inventory flow. In some embodiments, the second central system is in communication with a first central system, the mobile inventory transport unit, and the transportation system, and is operationally configured to determine an inventory demand at a second location, transmit inventory request data to the first central system, receive data from the first central system, transmit to and receive data from the transportation system, and transmit to and receive data from the mobile inventory transport unit. In further embodiments, the method of transmitting and receiving mobile inventory transport unit data, first central system data, and transportation system data of the second central system may be Wi-Fi, cellular, or Bluetooth.

In some other embodiments, a system for transporting a mobile inventory transportation unit in a mobile inventory transportation communication network is described, the system comprising one or more hardware processors configured by machine-readable instructions, the mobile inventory transport unit comprising a housing, an inventory storage device, wherein the inventory storage device is physically coupled to the housing, a power device, wherein the power device is operationally configured to supply power to the electrical components of the mobile inventory transport unit, and is selected from a group consisting of a battery cell, fuel cell, and solar cell, and a drive device, wherein the drive device is in electrical communication with the power device, and is operationally configured to physically move the mobile inventory transport unit from a first point to a second point. In some embodiments, the system may further comprise a navigation device, wherein the navigation device is in electrical communication with the power device and is operationally configured to transmit and receive geographic data and determine the physical location of the mobile inventory transport unit.

In some embodiments, the system may also comprise a sensing device, wherein the sensing device is in electrical communication with the power device and is operationally configured to detect physical objects and transmit and receive physical object data. In some embodiments, the system may comprise a control device, wherein the control device is in electrical communication with the power device, the drive device, the navigation device, and the sensing device, and is operationally configured to control the mobile inventory transport unit and transmit and receive data from physically separate systems.

In some embodiments, the system may comprise a transportation system, wherein the transport system is operationally configured to transmit to and receive data from the mobile inventory transport unit and other secondary systems, physically receive the mobile inventory transport unit, and physically transport the mobile inventory transport unit from a first point to a second point. In some embodiments, the system may comprise a second central system, wherein the second central system is in communication with a first central system, the mobile inventory transport unit, and the transportation system, and is operationally configured to determine an inventory demand at a second or more location, transmit inventory request data to the first central system, receive data from the first central system, transmit to and receive data from the transportation system, and transmit to and receive data from the mobile inventory transport unit.

In some embodiments, the system may comprise a first central system, wherein the first central system is in communication with the control device of the mobile inventory transport unit, transportation system, and the second central system, and is operationally configured to receive inventory request data from the second central system, transmit to and receive data from the second central system, transmit to and receive data from the mobile inventory transport unit, schedule the movement of the mobile inventory transport unit, transmit to and receive data from the transportation system, and control the delivery of the mobile inventory transport unit to a final destination.

In some other embodiments, a non-transitory, tangible computer readable storage medium, encoded with processor readable instructions to perform a method for transporting a mobile inventory transportation unit in a mobile inventory transportation communication network is described. In some embodiments, the mobile inventory transportation communication network may comprise a mobile inventory transport unit, a transportation system, a first and a second central system. In some embodiments, the mobile inventory transport unit comprises a housing, an inventory storage device, physically coupled to the housing, and a power device, wherein the power device is operationally configured to supply power to the electrical components of the mobile inventory transport unit, and is selected from a group consisting of a battery cell, fuel cell, and solar cell.

In some embodiments, the mobile inventory transport unit comprises a drive device, wherein the drive device is in electrical communication with the power device and is operationally configured to physically move the mobile inventory transport unit from a first point to a second point. In some embodiments, the mobile inventory transport unit also comprises a navigation device, wherein the navigation device is in electrical communication with the power device and is operationally configured to transmit and receive geographic data and determine the physical location of the mobile inventory transport unit.

In some embodiments, the mobile inventory transport unit comprises a sensing device, wherein the sensing device is in electrical communication with the power device, and is operationally configured to detect physical objects and transmit and receive physical object data, and a control device, wherein the control device is in electrical communication with the power device, the drive device, the navigation device, and the sensing device, and is operationally configured to control the mobile inventory transport unit and transmit and receive data from physically separate systems.

In some embodiments, the method comprises configuring a transportation system to transmit to and receive data from the mobile inventory transport unit and other secondary systems, physically receive the mobile inventory transport unit, and physically transport the mobile inventory transport unit from a first point to a second point. In some embodiments, the method also comprises configuring the second central system to determine an inventory demand at a second or more location, transmit inventory request data to the first central system, receive data from the first central system, transmit to and receive data from the transportation system, and transmit to and receive data from the mobile inventory transport unit, wherein the second central system is in communication with the first central system, the mobile inventory transport unit, and the transportation system.

In some embodiments, the method also comprises configuring the first central system to receive data from the second central system, transmit to and receive data from the mobile inventory transport unit, schedule the movement of the mobile inventory transport unit, transmit to and receive data from the transportation system, and control the delivery of the mobile inventory transport unit to a final destination, wherein the first central system is in communication with the control device of the mobile inventory transport unit, transportation system, and the second central system, and is operationally configured to receive inventory request data from the second central system.

In some other embodiments, a method for transporting a mobile inventory transportation unit in a mobile inventory transportation communication network is described. In some embodiments, the mobile inventory transportation communication network may comprise a mobile inventory transport unit, a transportation system, a first and a second central system. In some embodiments, the mobile inventory transport unit comprises a housing, an inventory storage device, physically coupled to the housing, and a power device, wherein the power device is operationally configured to supply power to the electrical components of the mobile inventory transport unit, and is selected from a group consisting of a battery cell, fuel cell, and solar cell.

In some embodiments, the mobile inventory transport unit comprises a drive device, wherein the drive device is in electrical communication with the power device and is operationally configured to physically move the mobile inventory transport unit from a first point to a second point. In some embodiments, the mobile inventory transport unit also comprises a navigation device, wherein the navigation device is in electrical communication with the power device and is operationally configured to transmit and receive geographic data and determine the physical location of the mobile inventory transport unit.

In some embodiments, the mobile inventory transport unit comprises a sensing device, wherein the sensing device is in electrical communication with the power device, and is operationally configured to detect physical objects and transmit and receive physical object data, and a control device, wherein the control device is in electrical communication with the power device, the drive device, the navigation device, and the sensing device, and is operationally configured to control the mobile inventory transport unit and transmit and receive data from physically separate systems.

In some embodiments, the method comprises configuring a transportation system to transmit to and receive data from the mobile inventory transport unit and other secondary systems, physically receive the mobile inventory transport unit, and physically transport the mobile inventory transport unit from a first point to a second point. In some embodiments, the method also comprises configuring the second central system to determine an inventory demand at a second or more location, transmit inventory request data to the first central system, receive data from the first central system, transmit to and receive data from the transportation system, and transmit to and receive data from the mobile inventory transport unit, wherein the second central system is in communication with the first central system, the mobile inventory transport unit, and the transportation system.

In some embodiments, the method also comprises configuring the first central system to receive data from the second central system, transmit to and receive data from the mobile inventory transport unit, schedule the movement of the mobile inventory transport unit, transmit to and receive data from the transportation system, and control the delivery of the mobile inventory transport unit to a final destination, wherein the first central system is in communication with the control device of the mobile inventory transport unit, transportation system, and the second central system, and is operationally configured to receive inventory request data from the second central system.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

DETAILED DESCRIPTION

The words "for example" is used herein to mean "serving as an example, instance, or illustration." Any embodiment described herein as "for example" is not necessarily to be construed as preferred or advantageous over other embodiments.

The flowcharts and block diagrams in the following figures illustrate the architecture, functionality, and operation of possible implementations of devices, systems, methods, and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Figure 1:
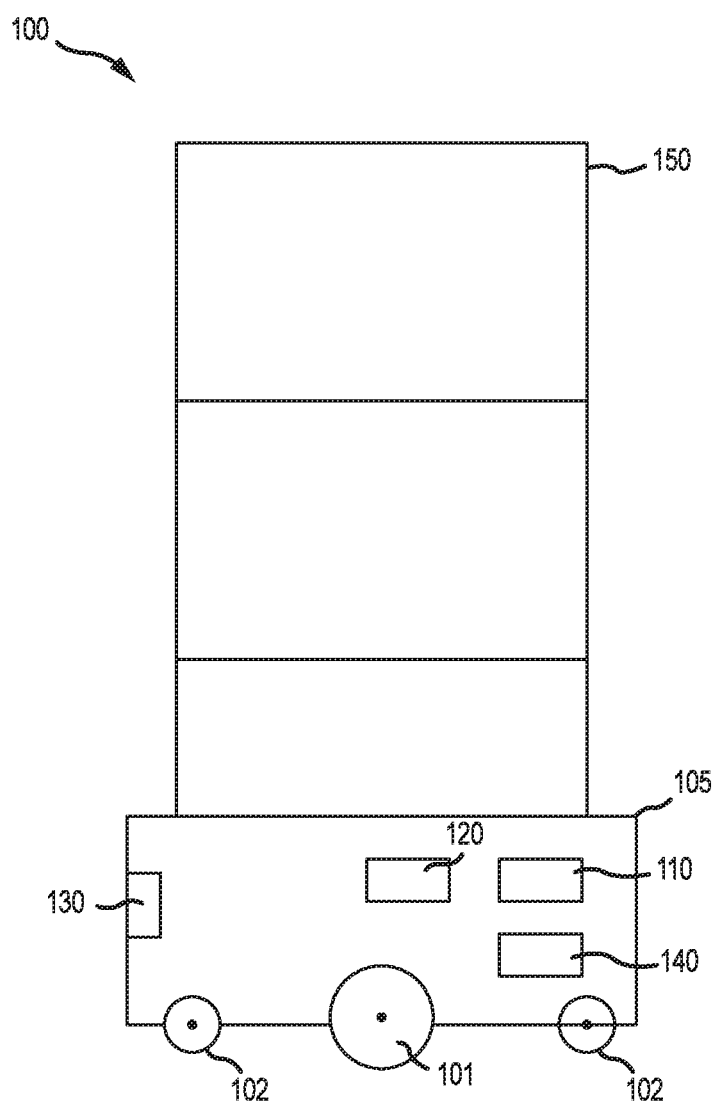
FIG. 1 illustrates a sample mobile inventory transport unit (MITU) in accordance with embodiments described herein.

FIG. 1 illustrates an example of a Mobile Inventory Transport Unit (MITU) 100. In some cases, MITU 100 may comprise a robot portion, including at least drive device 101, balance device 102, control device 110, navigation device 120, sensing device 130, and power device 140. Further, the MITU 100 may comprise a structural portion including at least housing 105 and inventory storage device 150. In some embodiments, the MITU is configured to account for various anomalies in the environment, such as raised surfaces or other varying terrain, as further described above. In those cases, the MITU may be adapted to maneuver in these environments as well. In some examples, the robot portion of the MITU 100 may be shaped like a cube, a cuboid, a cylinder, or any other shape, and may comprise one or more wheels and balance devices on its lower portion. In some other cases, the robot portion may be surrounded by, or substantially surrounded by the housing device 105. Further, the robot portion may be in electronic communication (either wired or wireless) with the housing device 105 and/or the inventory storage device 150.

MITU 100 includes drive device 101. Drive device 101 supplies the method of moving MITU 100. Drive device 101 may be a variety of locomotion devices including one or more wheels, treads, or actuators. In some cases, drive device 101 may comprise four wheels, one on each edge or side of MITU 100. In some cases, one or more wheels may be raised up while the MITU 100 is traveling in a straight line. In some other cases, all four wheels may be in contact with the ground, for instance, to turn the MITU 100. In some embodiments, drive device 101 and control device 110 may control the pace at which the wheels rotate (i.e., same or different pace), allowing the MITU 100 to turn or take corners.

In some examples, MITU 100 may be bipedal (2), quadrupedal (4), or hexapedal (6), and drive device 101 may comprise one or more legs. In some other examples, MITU 100 may comprise a combination of wheels and legs and may be referred to as a hybrid transport unit. In yet other examples, drive device 101 may enable MITU 100 to navigate by slithering (i.e., in a snake like motion). In some aspects, drive device 101 is the primary method for physically moving MITU 100 from a start point to an end point.

In some cases, MITU 100 may include balance device 102. In some cases, balance device 102 may supply weight distribution of MITU 100 and may offset the force exerted by drive device 101 when MITU 100 is either stationary or moving. In some examples, balance device 102 may incorporate a variety of balance devices including one or more wheels, one or more bearings, or a fixed apparatus. For instance, balance device 102 may be composed of two wheels, one in the front and one in the rear of the MITU 100. In some other cases, balance device 102 may comprise one or more sensors, such as a gyroscope, an accelerometer, or a combination. A gyroscope may be an example of a device used for measuring or maintaining orientation and/or angular velocity, and the orientation of the MITU 100 may be adjusted based in part on the output readings from the gyroscope. In some examples, a gyroscope or an accelerometer may be used in combination with a controller (e.g., a proportional-integral-derivative (PID) controller) to balance the MITU 100. In one example, MITU 100 or a control device 110 of MITU 100 may gather readings from one or more sensors (e.g., accelerometer or gyroscope) installed within the MITU. Further, MITU 100 may calculate an altitude (i.e., angle with respect to the horizon, or a surface the MITU is traveling over), compare the angle with a target angle (e.g., 0 degrees if it's a flat surface, 15 degrees, 30 degrees, etc., if it's an incline), and calculate a difference between the two angles. Based on the difference between the angles, the drive device 101 may cause the MITU 100 to accelerate (or decelerate) until the difference between the angles is reduced to zero to preserve the balance.

MITU 100 includes housing 105. Housing 105 encloses the electrical and physical components of contained within MITU 100. Housing device 105 is physically coupled to an inventory storage device and serves as the base for the inventory storage device. Importantly, the physical coupling conjoins the inventory storage device and the housing device 105 such that the two devices function as one physical object. In some cases, the housing device 105 and the inventory storage device may be joined via screws, nuts and bolts, nails, any other type of fastener, or even welding. In some cases, the housing 105 may comprise one or more slots or openings for a sensor or sensing device 130. Further, the sensing device 130 (e.g., camera, or object detection device) may be installed such that it is aligned or substantially aligned with the one or more slots or openings. In some examples, there may be a slot or opening on each side or edge of the housing, allowing a 360-degree field of view at the MITU 100. In some embodiments, one or more edges of the housing 105 (e.g., front edge) may comprise an additional opening behind which a one or more other sensors (e.g., a LIDAR sensor) may be installed.

MITU 100 includes control device 110. Control device 110 locally controls the autonomous movement of MUTU 100 in response to multiple inputs. Control Device 110 includes a control unit which incorporates software and hardware into autonomous control of MITU 100. Control device 110 may be in communication with multiple other systems including one or more central systems and/or transportation systems to control the movement of MITU 100 in response to these systems' requirements. Control device 100 is also in communication with sensing device 130 and respond to physical objects that sensing device 130 may detect. Control device 110 is also in communication with drive device 101 to control the movement of MITU 100. In some cases, control device 110 may include an analog to digital (ADC) converter to convert analog readings (or signals) from the various sensors into digital signals and may also incorporate a feedback loop. As an example, MITU 100 may be configured to travel in a straight-line while being surrounded on both sides by other objects (e.g., robots, shelves, etc.), a typical scenario inside a warehouse. Further, the control device 110 may receive information pertaining to the objects from the sensing device 130. In some cases, the sensing device 130 may comprise one or more infrared object detectors that can measure the distance from the left and right sides of the MITU 100 to the objects. The sensing device 130 may create a continuous analog voltage that depends inversely on the distance to the objects. In some cases, the analog voltage may be passed on to the ADC converter in the control device 110, following which the control device 110 computes an error (e.g., a difference between readings from the left and right sides of the robot), and adjusts the inputs to the drive device 101 until the error is reduced to zero.

MITU 100 includes navigation device 120. Navigation device 120 determines the physical position of MITU 100 and communicates the location data to the control device 110. Navigation device 120 may incorporate a variety of methods of location identification including one or more of Global Positioning System (GPS), 802.11 Wi-Fi, Cellular, Quick Response (QR) codes, barcodes, Radio-Frequency Identification (RFID), Near Field Communication (NFC), magnetic positioning, Ultra-wide band (UWB), ultrasound, etc. While GPS and cellular methods of location identification suffice for outdoor applications, they lack accuracy and reliability indoors, especially in large multistory buildings (e.g., warehouses, hotels, office buildings), airports, parking garages, and underground locations. In such cases, alternate techniques and devices may be utilized to provide indoor position, which may range from Wi-Fi and Bluetooth antennas to purpose-built installations with relays and beacons.

In some other cases, QR codes or barcodes may be affixed to known locations inside the warehouse or indoor structure navigated by the MITU 100. For instance, a MITU 100 navigating within a warehouse or building may be able to determine its location based on scanning and decoding the QR codes. In some cases, the MITU 100 may be aware of the QR code associated with an end point within the warehouse. In such cases, the MITU may navigate (e.g., in straight lines between QR codes), until the end point is reached. In one example, localization of the MITU 100 may be determined from odometry readings gathered from the drive device 101. For instance, the control device 110 or the drive device 101 may maintain an accurate count of the number of times the drive device 101 or a motor turning the wheels has turned. Further, since the diameter of the wheel and the starting point is known, the localization of the MITU 100 may be determined by calculating straight line distances between two adjacent points. As an example, if MITU 100 is navigating between a starting point A and an ending point F, via intermediate points B, C, D, and E, the control device 110 or drive device 101 may compute the number of times the drive device 101 needs to turn in order to ensure MITU 100 reaches point B, recalculates the number of times the drive device 101 needs to turn to reach point C (i.e., once point B is reached), and so on. In some cases, the MITU 100 may determine it has reached an intermediate point based on scanning a QR code at that point. In some examples, the QR codes may be affixed to the floor, on the ceiling, or another known location. Further, the QR codes may be visible (e.g., printer ink) or invisible (e.g., UV ink, infrared ink, etc.) to the naked human eye. In some cases, a camera, or QR code or barcode reader on the MITU 100 may be configured to scan and identify codes painted in ink invisible to the human eye. Additionally, or alternatively, the MITU 100 may comprise one or more infrared LEDs for illuminating targets, which can then be identified by the camera or QR code reader.

MITU 100 includes sensing device 130. Sensing device 130 responds to physical object present near MITU 100. Sensing device 130 may incorporate a variety of sensing methods, including LIDAR, Radar, Laser, ultrasound (or ultrasonic), and Infrared sensing technologies. Sensing device 130 communicates the physical object data to control device 110. Single or multiple camera configurations may be incorporated in order to provide stereo camera implementations to extract other data such as depth information. In some cases, the sensing device 130 may generate a 3D virtual rendition of the warehouse or building to assist MITU 100 during navigation. In some circumstances, the MITU 100 may combine the 3D virtual model of its navigating environment with real data, such as, but not limited to, physical building measurements, real-time acquired robot's position (i.e., based on rotation of wheels, QR codes, etc.), and data acquired from laser scanning to further enhance and visualize object detection for navigation. In some other cases, the sensing device 130 may deploy a technology, referred to as Simultaneous Location and Mapping (SLAM), where data from multiple sensors may be fused together to enable the MITU 100 to locate itself in a predetermined map without the use of fixed markers (e.g., QR codes, beacons, RFID tags, etc.). It should be noted that while SLAM improves navigation flexibility as compared to QR codes, SLAM may be more difficult or costly to implement.

MITU 100 includes power device 140. Power device 140 supplies power to various components of MITU 100. Power Device 140 may be in electrical communication with drive device 101, control device 110, navigation device 120, sensing device 130, and inventory device 150. In some cases, power device 140 may be a battery, a fuel cell, a solar cell, to name a few non-limiting examples. In other embodiments, inductive charging may be utilized, which may allow the robot or MITU 100 to charge while moving, such as when the robot is moving up and down aisleways, or when MITU 100 is loaded on the transport vehicle. In such cases, the MITU 100 may not need to dock to a charge station.

MITU 100 includes inventory storage device 150. Inventory storage device 150 stores physical items, such as inventory, that MITU 100 moves from at least a first physical location to a second physical location, or even multiple locations. Inventory storage device 150 may be a variety of storage devices including shelves, buckets, augers, and arms. Further, inventory storage device may be physically coupled to housing device 105. In other words, the physical coupling of housing device 105 and inventory storage device 150 creates one physical object. As shown, in some examples, the housing device 105 and inventory storage device 150 may be in the form of a cube or a cuboid, and may be joined together via welding, or using one or more fasteners. In some other cases, a rod or pole (not shown) may pass through the center of the housing device 105, where the rod is affixed to the upper portion of the housing device 105. Further, the inventory storage device 150 may be installed on or around the rod, such that the rod passes through one or more shelves of the inventory storage device (i.e., shelves are perpendicular to the rod).

In some embodiments, the inventory storage device 105 may receive power from power device 140 of the robot portion of the MITU 100. Additionally, or alternatively, the inventory storage device 105 may also comprise a power source (not shown), which may be used as a backup for power device 140. In some cases, the power may be transferred via cabling running through the center of the robot portion and the housing device 105. For instance, one or more power cables may be installed around or inside the center rod (or pole) of the MITU 100. In one example, the robot portion of the MITU 100 may be configured to rotate inside the housing device 105, for instance, when MITU 100 is turning at a corner. In such cases, a slip ring may be used to supply power and data to from the power device 140 to the inventory storage device 105. Slip rings may be examples of electromechanical devices that allow the transmission of power and electrical signals from a rotating object (e.g., robot portion) to a stationary structure (e.g., inventory storage device).

In some other cases, the power may be transferred wirelessly (e.g., resonant inductive coupling) or via an NFC connection. For instance, the housing device 105 and the inventory storage device 150 may comprise NFC antennas that are coupled and spaced a distance (e.g., 1 mm, 2 mm, 1 cm, 2 cm, etc.) apart, allowing bidirectional transfer of power and data. The NFC antennas may be microstrip patch antennas (e.g., square, rectangle, circular, elliptical, or any other continuous shape) fabricated on the surface of a printed circuit board (PCB). Further, the substrate of the PCB may be composed of a dielectric material, such as Gallium Nitride (GaN), Gallium Arsenide (GaAs), epoxy resin, Teflon, ceramic, etc.

Figure 2:
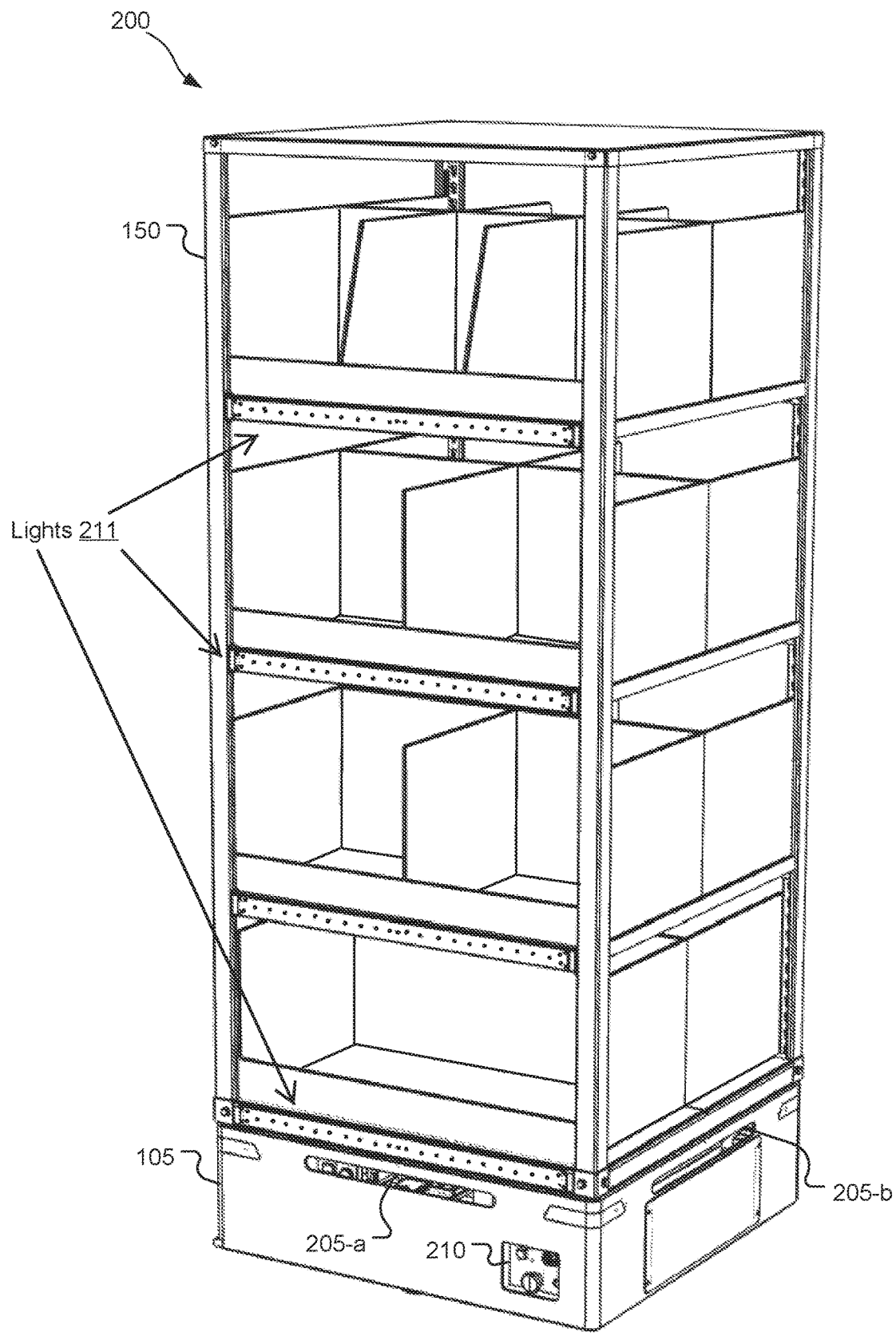
FIG. 2 illustrates a mobile inventory transport unit (MITU) in accordance with embodiments described herein.

FIG. 2 illustrates a top perspective view of a MITU 200 in accordance with one or more embodiments of the disclosure. In some cases, MITU 200 may be an example of MITU 100, as described with reference to FIG. 1, and may include one or more of its sub-components. For instance, MITU 200 may comprise a robot portion, including at least a drive device, a balance device, a control device, a navigation device, a sensing device, and a power device. Further, the MITU 200 may comprise a structural portion including at least housing 105 and inventory storage device 150. As shown, in some examples, the robot portion of the MITU 200 may be shaped like a cube, a cuboid, a cylinder, or any other shape, and may comprise one or more wheels and balance devices on its lower portion. In some other cases, the robot portion may be surrounded by, or substantially surrounded by the housing 105. Further, the robot portion may be in electronic communication (either wired or wireless) with the housing device 105 and/or the inventory storage device 150.

In some embodiments, the inventory storage device 150 may comprise one or more rows of lights 211 (e.g., Light Emitting Diode (LED) lights). Further, the robot portion or the inventory storage device 150 may be configured to illuminate one or more lights or an entire row of lights, for instance, while a user is loading or unloading the shelves of the inventory storage device. In some cases, such lighting may be used to indicate which shelf or section of the inventory storage device a user is meant to pick an item from, which may not only serve to accelerate the loading and unloading process, but also improve user accuracy. In some other cases, the rows of lights may be replaced by, or used in conjunction with a display (e.g., Liquid Crystal Display (LCD) screen). In such cases, the LCD display or screen may be used to display information such as product specification, pricing information, or even a product image.

In some examples, the housing 105 may comprise one or more slots 205 (e.g., slot 205-a, slot 205-b, etc.) on one or more sides/faces. In some embodiments, a sensing device may be placed behind the one or more slots 205. In such cases, the sensing device may have a clear field of view, even as the robot portion of MITU 200 rotates inside the housing 105. In some cases, housing 105 may comprise one or more manual interfaces 210. Further, the manual interface 210 may be a manual power switch through which a user can turn the MITU on/off. In some other cases, the manual interface 210 may comprise one or more connectors (i.e., metallic or conductive), which may be used to dock the MITU to an external charging station. In some examples, the MITU 200 may be configured to navigate autonomously to a charging station when its battery or power level falls below a threshold (e.g., 10%, 20%, etc.).

Figure 3:
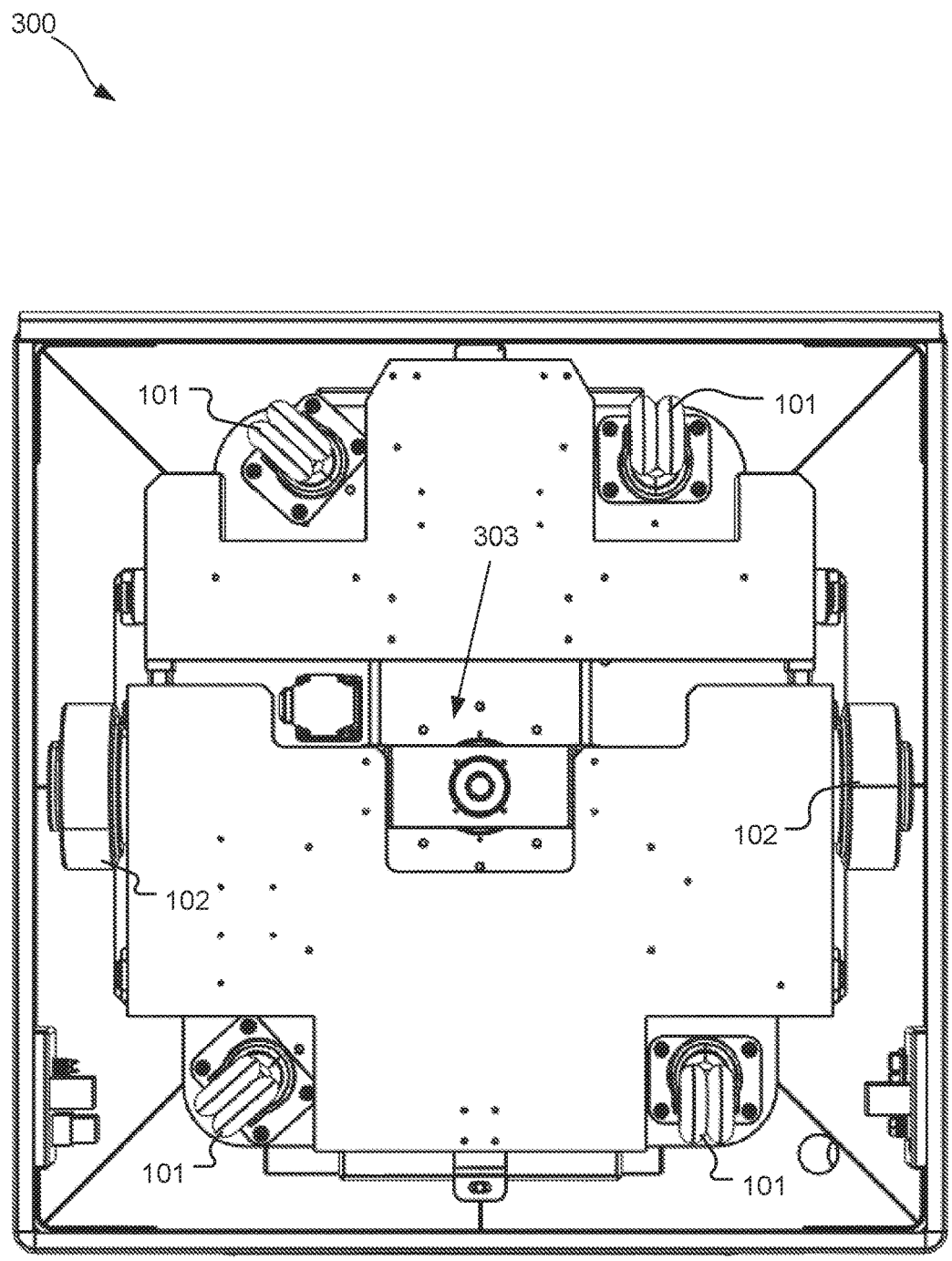
FIG. 3 is a bottom view of a MITU in accordance with embodiments described herein.

FIG. 3 is a bottom view of a MITU 300 in accordance with one or more embodiments of the disclosure. In some cases, MITU 300 may be an example of MITU 100 or MITU 200, as described with reference to FIGS. 1 and 2, respectively. For instance, MITU 300 may comprise a robot portion, including at least a drive device 101, a balance device 102, a control device, a navigation device, a sensing device, and a power device. Further, the MITU 300 may comprise a structural portion including at least a housing and an inventory storage device (not shown). In some cases, the MITU 300 may comprise one or more bottom plates to which the drive device 101 and balance device 102 are attached. Further, the bottom plates may be joined via a hinge 303, allowing the robot portion of the MITU 300 to flex during navigation (e.g., while it moves over an uneven surface). Additionally or alternatively, the MITU 300 may comprise one or more springs (not shown) for suspension.

Figure 4:
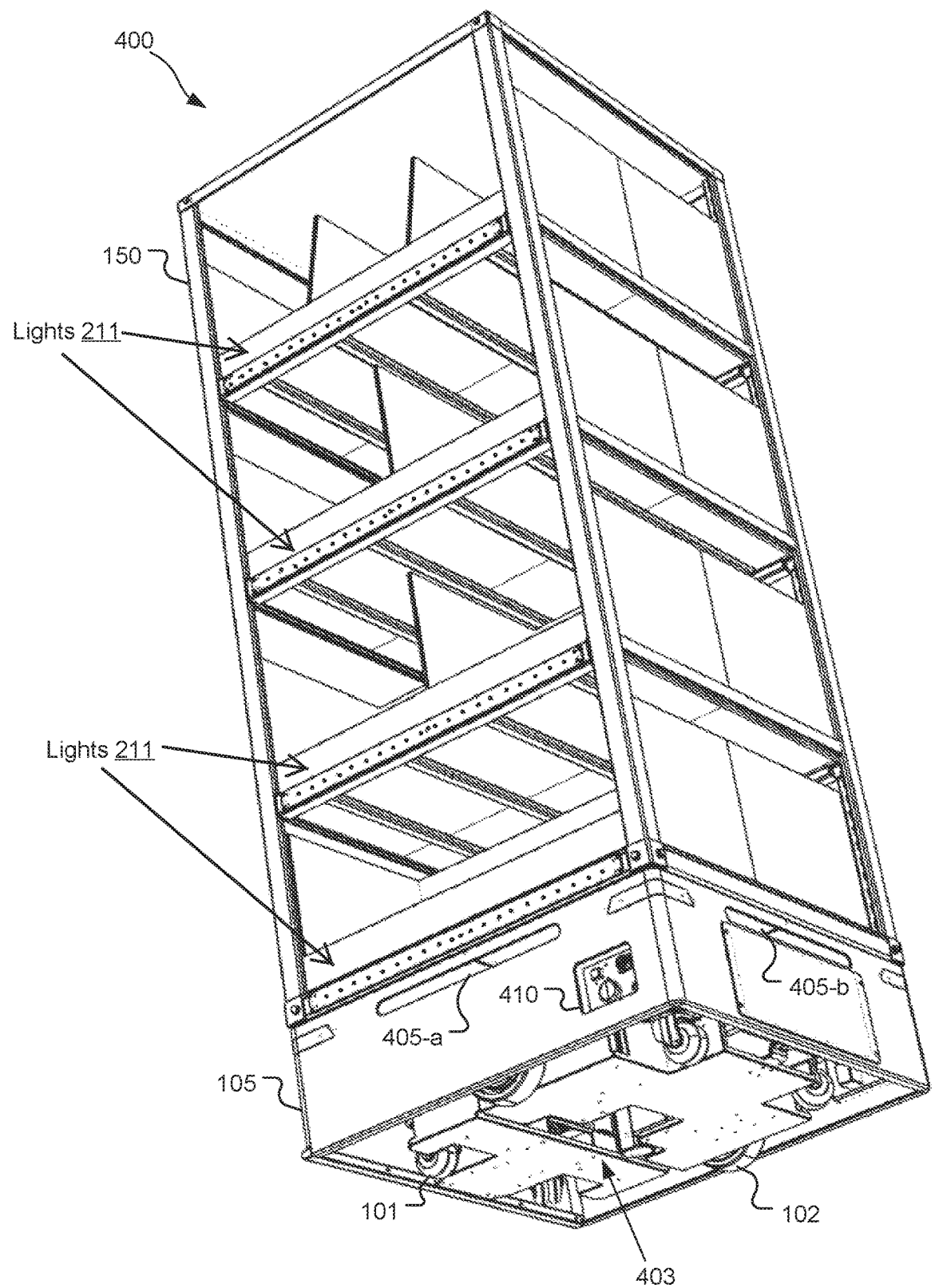
FIG. 4 is a bottom perspective view of a MITU according to various embodiments of the disclosure.

FIG. 4 illustrates a top perspective view of a MITU 400 in accordance with one or more embodiments of the disclosure. In some cases, MITU 400 may be an example of MITU 100 or MITU 200 or MITU 300, as described with reference to FIGS. 1, 2, and 3, respectively, and may include one or more of their sub-components. For instance, MITU 400 may comprise a robot portion, including at least a drive device 101, a balance device 102, a control device, a navigation device, a sensing device, and a power device. Further, the MITU 400 may comprise a structural portion including at least housing 105 and inventory storage device 150. As shown, in some examples, the robot portion of the MITU 400 may be shaped like a cube, a cuboid, a cylinder, or any other shape, and may comprise one or more wheels and balance devices on its lower portion. In some other cases, the robot portion may be surrounded by, or substantially surrounded by the housing 105. Further, the robot portion may be in electronic communication (either wired or wireless) with the housing device 105 and/or the inventory storage device 150.

As described in relation to FIG. 2, in some embodiments, the inventory storage device 150 may comprise one or more rows of lights 211 (e.g., Light Emitting Diode (LED) lights). Further, the robot portion or the inventory storage device 150 may be configured to illuminate one or more lights or an entire row of lights, for instance, while a user is loading or unloading the shelves of the inventory storage device. In some cases, such lighting may be used to indicate which shelf or section of the inventory storage device a user is meant to pick an item from, which may not only serve to accelerate the loading and unloading process, but also improve user accuracy. In some other cases, the rows of lights may be replaced by, or used in conjunction with a display (e.g., Liquid Crystal Display (LCD) screen). In such cases, the LCD display or screen may be used to display information such as product specification, pricing information, or even a product image In some examples, the housing 105 may comprise one or more slots 405 (e.g., slot 405-a, slot 405-b, etc.) on one or more sides/faces behind which a sensing device may be placed. In some cases, housing 105 may comprise one or more manual interfaces 410. Further, the manual interface 410 may be a manual power switch through which a user can turn the MITU on/off. In some other cases, the manual interface 410 may comprise one or more connectors (i.e., metallic or conductive), allowing the MITU 400 to dock to an external charging station. In some examples, the MITU 400 may be configured to navigate autonomously to a charging station when its battery or power level falls below a threshold (e.g., 10%, 20%, etc.).

As described with reference to FIG. 3, in some cases, the MITU 400 may comprise one or more bottom plates to which one or more of the drive devices 101 and balance devices 102 may be attached. Further, the bottom plates may be joined via a hinge 403, allowing the robot portion of the MITU 400 to flex during navigation (e.g., while it moves over an uneven surface). Additionally or alternatively, the MITU 400 may comprise one or more springs (not shown) for suspension.

Figure 5:
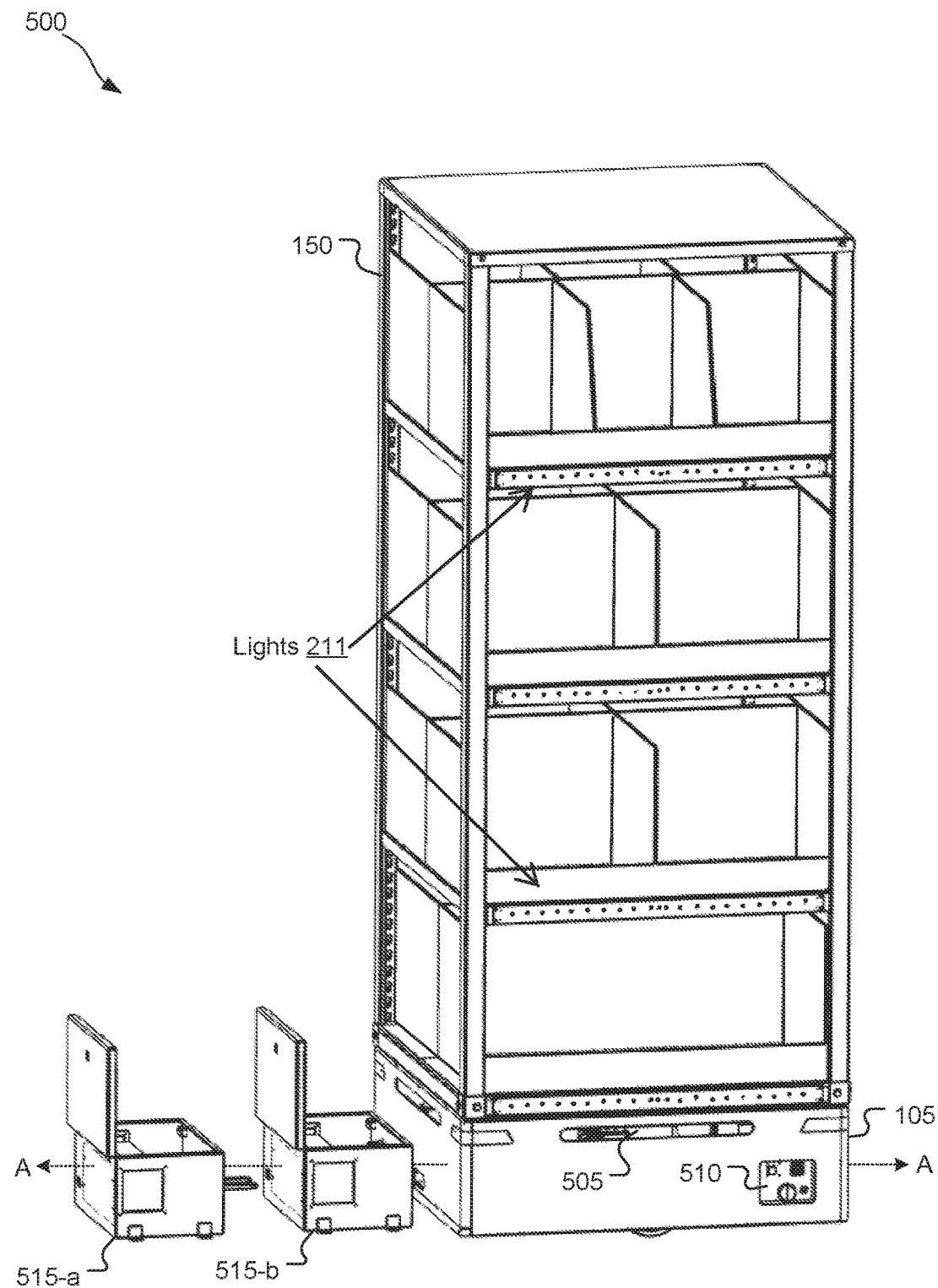
FIG. 5 is a side view of a MITU in accordance with an alternate embodiment of the disclosure.

FIG. 5 illustrates a side view of a MITU 500, in accordance with an alternate embodiment of the disclosure. In some cases, MITU 500 may be similar to or substantially similar to MITU 100 or 200 or 300 or 400, as described with reference to FIGS. 1, 2, 3, and 4, respectively. Further, MITU 500 may include one or more their sub-components. For instance, MITU 500 may comprise a robot portion, including at least a drive device, a balance device, a control device, a navigation device, a sensing device, and a power device. Further, the MITU 500 may comprise a structural portion including at least housing 105 and inventory storage device 150. As shown, in some examples, the robot portion of the MITU 500 may be shaped like a cube, a cuboid, a cylinder, or any other shape, and may comprise one or more wheels and balance devices on its lower portion. In some other cases, the robot portion may be surrounded by, or substantially surrounded by the housing 105. Further, the robot portion may be in electronic communication (either wired or wireless) with the housing device 105 and/or the inventory storage device 150. In some cases, inventory storage device 150 may also comprise one or more lights 211, which may be similar to the lights 211 as described with reference to FIGS. 2 and 4.

In some examples, the housing 105 may comprise one or more slots 505 on one or more sides/faces behind which a sensing device may be placed. In some cases, housing 105 may also comprise one or more manual interfaces 510, which may be similar to the manual interfaces 410 as described with reference to FIG. 4.

As shown, in some embodiments, the housing portion of MITU 500 may comprise one or more detachable units (e.g., drawers 515-a, 515-b) that can slide in and out of the MITU. In some examples, these drawers may be electrically connected to the power device, and may be climate controlled (i.e., capable of both heating and cooling). In other cases, the inventory storage device 150 of MITU 500 may also be climate controlled. In such cases, the MITU 500 may be capable of transporting hot and cold items (e.g., food, beverages, medicines or vaccines, etc.).

Figure 6:
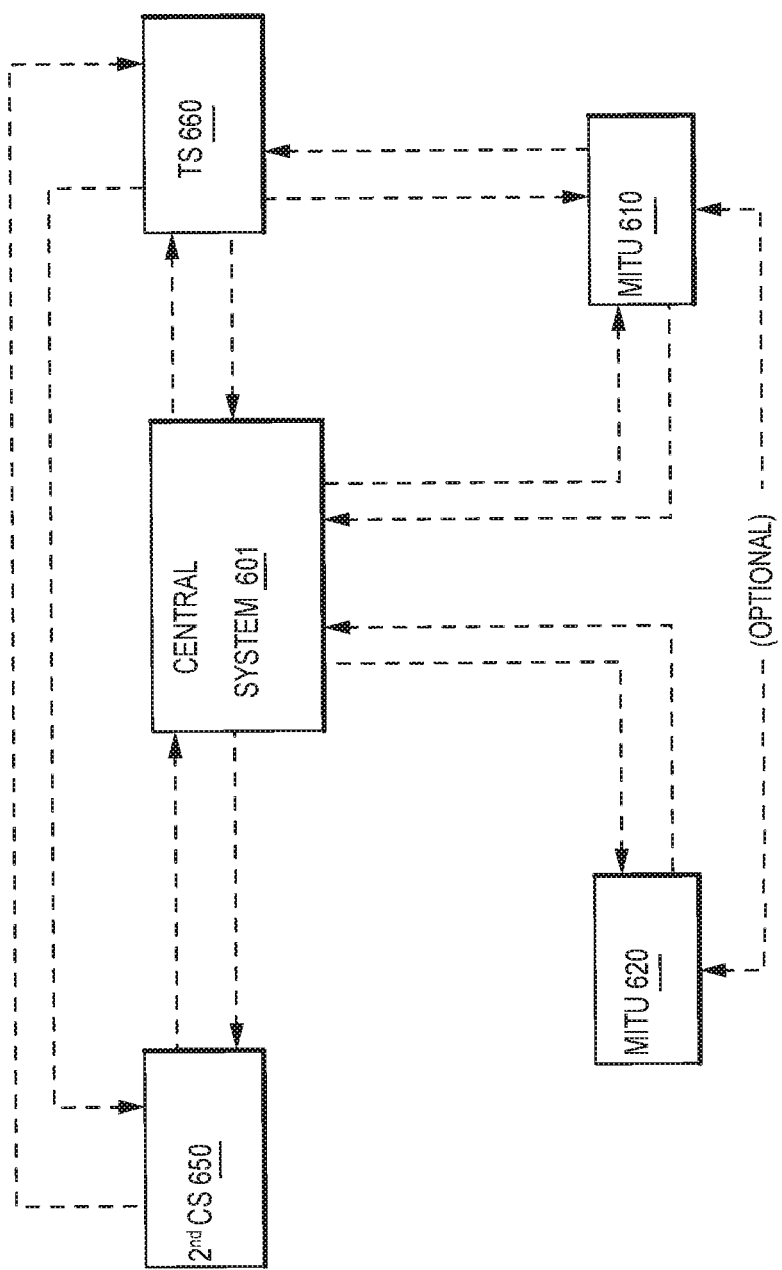
FIGS. 6 and 7 illustrate sample mobile inventory transport communication networks in accordance with embodiments described herein.

FIG. 6 illustrates a sample mobile inventory transport communication network. The mobile inventory transport communication network may include a first central system 601, a first MITU 610, a second MITU 620, a second central control system 650, and a transportation system 660.

The mobile inventory transportation communication network includes a first central system 601. First central system 601 is responsible for the cataloging and scheduling of all connected MITUs (e.g., MITU 610, MITU 620) that may be operating in the central systems communication network. The first central system 601 schedules the movements of the MITUs in response to demands at differing physical locations in the network. In some cases, first central system 601 may be in communication with one or more different central systems to respond to additional inventory demands outside the geographic region within which central system 601 operates. First central system 601 incorporates software and hardware to organize, schedule, and carry out the autonomous movements of the MITUs by communicating with the MITUs' local control devices. First central system 601 is also in communication with transportation systems that may be within the network. Such communication may be by Wi-Fi, cellular, Bluetooth, or any other communication means.

In some cases, the mobile inventory transportation communication network includes the first MITU 610. MITU 610 may be an example of MITU 100, as described with reference to FIG. 1. In some examples, MITU 610 may be in communication with the first central system 601 and may receive input for the scheduling and movement of MITU 610 from the first central system. In some circumstances, MITU 610 may also be in communication with one or more transportation systems.

In some cases, the mobile inventory transportation network may also include the second MITU 620, where MITU 620 may be or substantially similar to MITU 100, as described with reference to FIG. 1. In some cases, MITU 620 may be in communication with the first central system 601 and MITU 620 may receive inputs for its scheduling and movement from the first central system 601. Furthermore, MITU 620 may be in communication with a transportation system as well as MITU 610.

The mobile inventory transportation network includes transportation system 660. Transportation system 660 may be a variety of transportation systems including conveyors, elevators, or vehicles (e.g., automobiles, trucks, trains, aircrafts, boats, and/or ships). Transportation system 660 is primarily responsible for moving MITUs from a first geographic point to a second geographic point. For example, this may be accomplished by a conveyor system at a single geographic site which moves MITUs from one point to another, or it could be accomplished by loading MITUs into a vehicle and moving the MITUs to a second geographic region. Importantly, transportation system 660 is in communication with one or more central systems (e.g., first central system 601, second central system 650, etc.), and the scheduling and movement performed by transport system 660 may be monitored by a central system in order to allow for autonomous movement of the MITUs. For example, first central system 601 may communicate scheduling information to transportation system 660 and the MITUs. Further, the transportation system 660 may receive the MITUs that the first central system 601 has scheduled. Once transportation system 260 has received the MITUs, it transports the MITUs to a second location. In some examples, such a location could be across a single warehouse. In some other examples, such a location could extend across a larger geographic area, such as a city, state, or even a country.

The mobile inventory transportation network may include one or more additional central systems, such as, the second central system 650. In some cases, second central system 650 may be in communication with the first central system 201. Further, first central system 601 may communicate schedule, routing, and unit demands for MITUs at a first geographic site to the second central system 650 at the second geographic site. In some examples, second central system 650, similar to first central system 601, communicates its demands, scheduling and routing of MITUs. Both central systems, via this communication, may choreograph the movement of one or more MITUs between the two geographic areas that each central system is responsible for. This creates an interconnected network of central systems that facilitates organized movement of MITU's between multiple geographic locations, while responding to the demands of multiple central systems.

Figure 7:
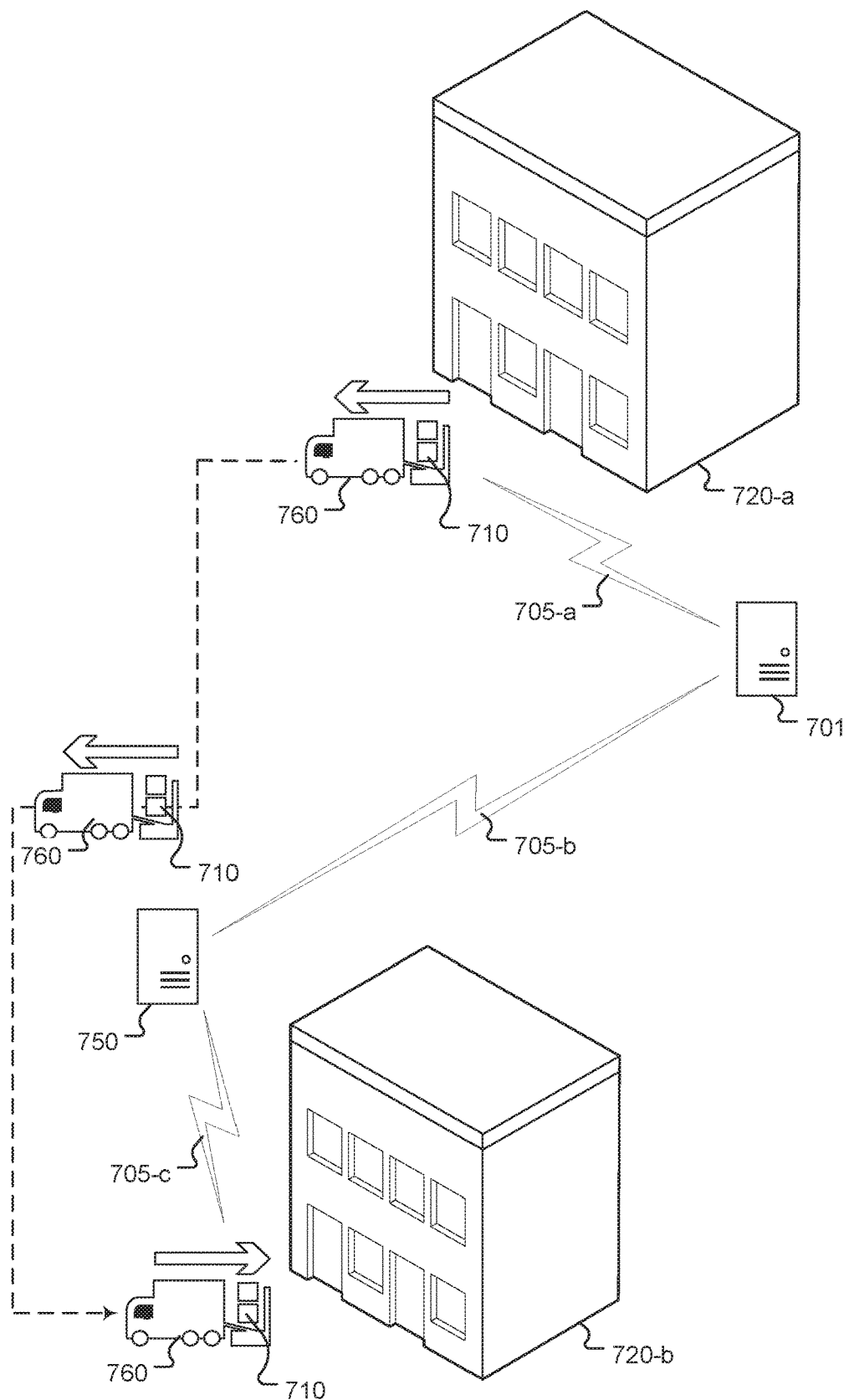

FIG. 7 illustrates a sample mobile inventory transport communication network 700, according to an embodiment of the disclosure. The mobile inventory transport communication network may include a first central system 701, a first MITU 710, a second central control system 750, and a transportation system 760. The mobile inventory transport communication network 700 may be an example of the mobile inventory transport communication network in FIG. 6.

As an example, transportation system 760 may transport the first MITU 710 from a first geographic location 720-*a* served by the first central system 701 to a second geographic location 720-*b* served by the second central system 750. In this case, once the transportation system 760 receives the MITU 710 in the first geographic location 720-*a*, the transportation system 760 may be in communication 705-*a* or 705-*c* with at least one of the central systems during its journey to the second geographic location 720-*b*. In some other cases, the transportation system 760 may always be in communication with both central systems. In yet other cases, the first central system 701 may handoff the transportation system 760 to the second central system 750 (i.e., via communication 705-*b*), for instance, based on the geographic location of the transportation system 760.

In some examples, once the MITU 710 is loaded on the transportation system, it may continue to remain in direct communication with at least the first central system 701, the second central system 750, or both. Alternatively, the MITU 710 may remain in direct communication with the first central system 701 until it reaches the second geographic site 720-*b*, following which it aborts communication with the first central system 701, and switches to communicating with the second central system 750.

In some other examples, the MITU 710 may remain in communication with the one or more central systems via the transportation system 760. For instance, the MITU 710 may communicate with the transportation system via one or more limited range communication techniques (e.g., Bluetooth or Near field Communications (NFC)), while the transportation system 760 may communicate with the central systems via one or more longer range techniques.

In some examples, the transportation system 760 and the MITU 710 may utilize a variety of techniques for communicating with the central systems, including cellular technology and Wi-Fi. Additionally or alternatively, the MITU 710 or the transportation system 760 may comprise GPS tracking chips, allowing their locations to be tracked in real-time by the central systems, which may serve to alleviate issues arising from inadequate cellular coverage (i.e., dead zones), or when the MITU 710 and its components are turned off to conserve power. It should be noted that the MITU 710 is autonomous and may be aware of the tasks it needs to complete at the second geographic site 720-*b*, prior to even leaving the first geographic site 720-*a*. In such cases, the MITU 710 may tracks its location in real-time and not disembark from the transportation system (e.g., even if the transportation system 760 breaks down, or takes a pit stop) until its GPS location matches that of the second site. Once the MITU 710 disembarks at the second site, the MITU 710 may initiate communications with the second central system (if not already initiated), determine any updates or changes to the tasks established at the first site, and respond to the inventory and scheduling demands at the second site.

Figure 8:
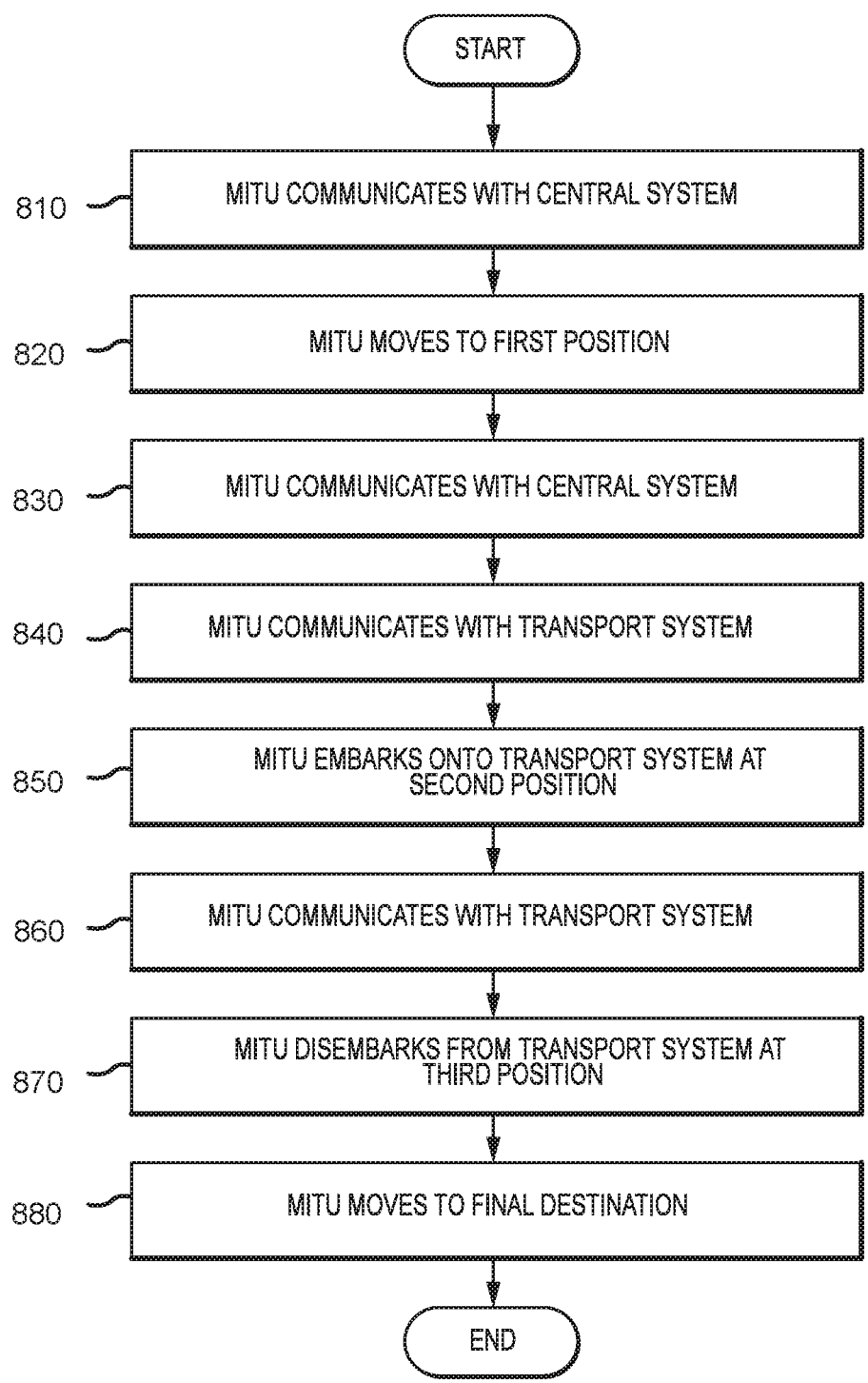
FIG. 8 illustrates a method of automation of a mobile inventory transport unit in accordance with embodiments described herein.

FIG. 8 shows a flowchart illustrating a method 800 for automation of a mobile inventory transport unit (MITU), according to an embodiment of the disclosure. The operations of method 800 may be implemented by a MITU or its components described herein, a first central system, a second central system, and a transportation system. For example, the operations of method 800 may be performed by the drive device, the balance device, control device, housing, navigation device, sensing device, power device, and inventory storage device of the MITU, as described with reference to FIGS. 1-5. In some examples, the MITU, the transportation system, or the first and second central systems may execute a set of codes to control the functional elements of the devices or systems to perform the functions described below. Additionally, or alternatively, the MITU and other systems may perform aspects of the functions described below using special-purpose hardware.

At 810, a second central system (i.e., at a second geographic site) may send an inventory request to a first central system (i.e., at a first geographic site). The first and second central systems may be similar to or substantially correspond with the first central system 801, or the second central system 850, as described with reference to FIGS. 6 and 7. At 811, the first central system may receive the inventory request from the second central system. At 812, the first central system may determine a MITU to meet the second site's request (e.g., related to an inventory demand). In some aspects, the first central system may determine the MITU to meet the inventory request based upon the central cataloging of all MITUs controlled by the first central system. In some cases, the MITU may be an example of MITU 100, described with reference to FIG. 1.

At 813, the first central system may communicate with the MITU selected to meet the inventory demand, following which the selected MITU moves to a first position at 820. In one example, the first central system may determine the scheduling and movement destination of the MITU, and the MITU, via communication with the central system, receives the destination and scheduling information from the first central system. Further, the MITU responds to this information and moves to the first position at 820.

At 830, the MITU may indicate or communicate to the first central system that it has reached the first position. In some cases, the central system may then communicate with a transportation system. The transportation system may be the same as transportation system 660 or 760, as described with reference to FIGS. 6 and 7, respectively. In some cases, the central system schedules the movement that the transportation system will perform on the MITU. Additionally or alternatively, at 840, the MITU may initiate communications with a transportation system once it reaches the first position, based in part on instructions received from the first central system. For instance, the first central system may instruct the MITU to initiate communications with a particular transportation system amongst the numerous transportations systems at that site. The communication also facilitates the MITU moving onto the transportation system once the transportation system has received scheduling and movement instructions from the central system.

At 850, the MITU may embark or move onto the transportation system from the first position, or a second position different from the first position. At 860, the MITU may continue to communicate with the transportation system once on the transportation system. The transportation system, via its communication with the central system, determines the scheduling of the MITU disembarking the transportation system at the MITU's scheduled destination.

In some cases, at 870, the MITU may disembark from the transportation system at a third position, wherein the third position may be at a second geographic site different from the first geographic site. In some other cases, the third position may be at the same geographic site, but the third position may be different from the first and the second position. In some cases, the MITU may only disembark from the transportation system once the transportation system has completed the scheduled movement of the MITU. Once the MITU disembarks from the transportation system at the third position, it carries out the remainder of its scheduled movement to the final destination at 880. At 880, the MITU may move to its final destination, which may correspond to the location scheduled by the first and second central systems in the initial communication operations (i.e., at 810 and 811).

Figure 9:
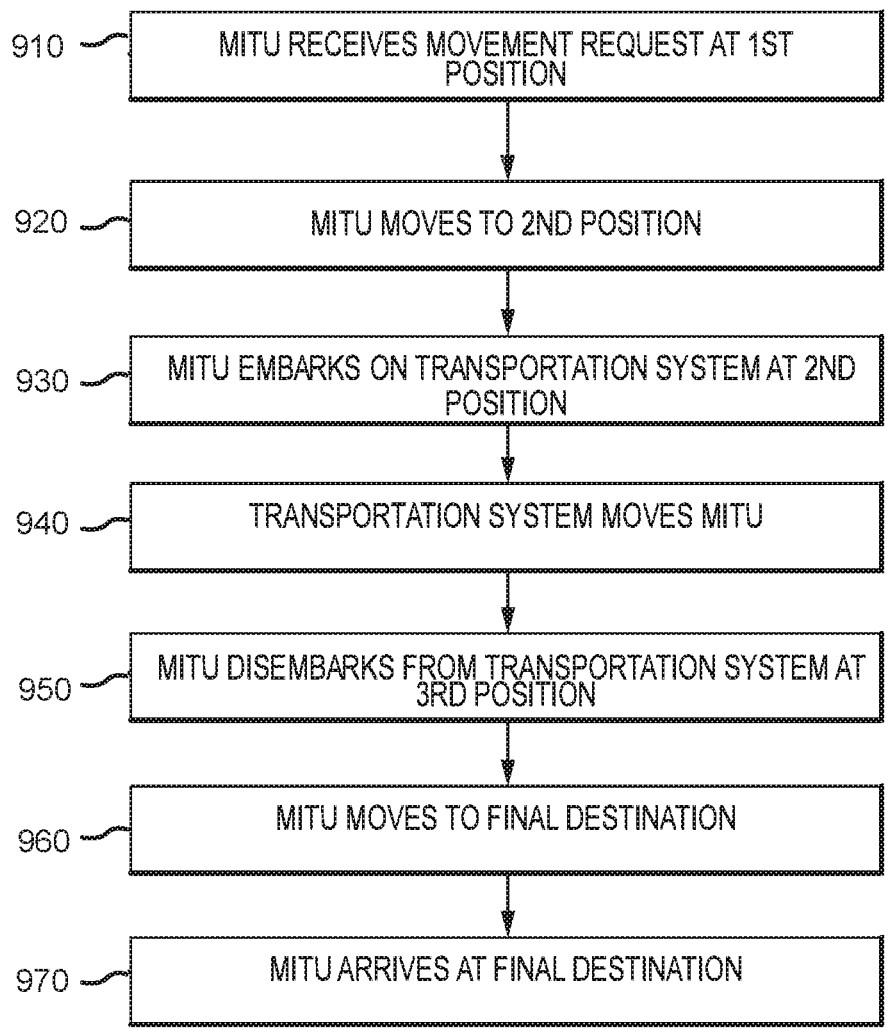
FIG. 9 illustrates a method of autonomous operation of a mobile inventory transport unit in accordance with embodiments described herein.

FIG. 9 shows a flowchart illustrating a method 900 for automation of a MITU, according to an embodiment of the disclosure. The operations of method 900 may be implemented by a MITU or its components described herein, a first central system, a second central system, and a transportation system. For example, the operations of method 900 may be performed by the drive device, the balance device, control device, housing, navigation device, sensing device, power device, and inventory storage device of the MITU, as described with reference to FIGS. 1 and 2. In some examples, the MITU, the transportation system, or the first and second central systems may execute a set of codes to control the functional elements of the devices or systems to perform the functions described below. Additionally, or alternatively, the MITU and other systems may perform aspects of the functions described below using special-purpose hardware.

At 901, the MITU may be positioned at a first position at a first geographic site. Further, the MITU may receive a movement request from the central system initiating the MITU's movement from the first position to a second position. In some cases, the MITU may be the same as MITU 100, as described with reference to FIG. 1. Further, the central system may be central system 601, as described with reference to FIG. 6. At 902, the MITU may respond to the movement request and move to a second position. The second position may correspond to a position required to embark onto a transportation system.

At 910, the MITU embarks on the transportation system via a ramp, or any other means. The transportation system may be an example of transportation system 660, as described with reference to FIG. 6. In some examples, the MITU is in communication with both the central system and the transportation system and may receive destination and scheduling information for the movement to be performed by the transportation system. Additionally or alternatively, the central system and the transportation system may be in communication with each other to match scheduling and destination information.

At 920, the transportation system moves the MITU over a fixed distance, based in part on identifying that the MITU has embarked on the transportation system. In some cases, the MITU may communicate to the transportation system that it is loaded on to the transportation system and ready to be transported. In some other cases, the transportation system may recognize that the MITU is on the transportation system based on scanning and identifying an RFID tag, QR code, Bluetooth module, etc., associated with the MITU, analyzing changes in weight distribution, or through visual inspection or object recognition. In some examples, the fixed distance traveled by the transportation system may be across the same geographic site (e.g., between two opposite ends of a warehouse). In some other cases, the fixed distance may span tens of miles (e.g., across a city, a state, or multiple states).

At 930, the transportation system may arrive at a third position (i.e., at the same or a different geographic site), following which the MITU then disembarks the transportation system at the third position. In some cases, the MITU may communicate that it has reached the third position to the central system, or another central system operating at the third position, if it's a different geographic site. At 931, the MITU may move to a fourth position (i.e., final destination) from the third position, where the third position corresponds to the disembarking location. At 950, the MITU arrives at the final destination.

In another embodiment, the central system is capable of re-tasking other inventory to fulfill orders which may have been delayed in transit and that won't meet a particular delivery timeline. For example, if a truck (i.e., a transportation system) transporting a MITU anticipates a potential delay in delivery (e.g., if the truck is stuck in traffic) based on knowledge of the timing and delivery schedule, the MITU or the truck may communicate the potential delay to the central server. In such cases, the central server system may be capable of re-tasking a new shelf to fulfill the order in an attempt to meet the delivery deadline, as well as reroute the delayed shelf. In similar embodiments, the MITU or transportation system can re-task itself once it has anticipated a delayed delivery.

In yet another embodiment, the systems may include a locating beacon, where the locating beacon may comprise a visual indicator, a radio frequency (RF) transmission, a Received Signal Strength Indicator (RSSI), or any other format. In these embodiments, a MITU may serve as an added input to the localization algorithm. For instance, if a MITU knows its precise location information, it may convey that information to other MITUs (e.g. while they are in motion) passing by.

Figure 10:
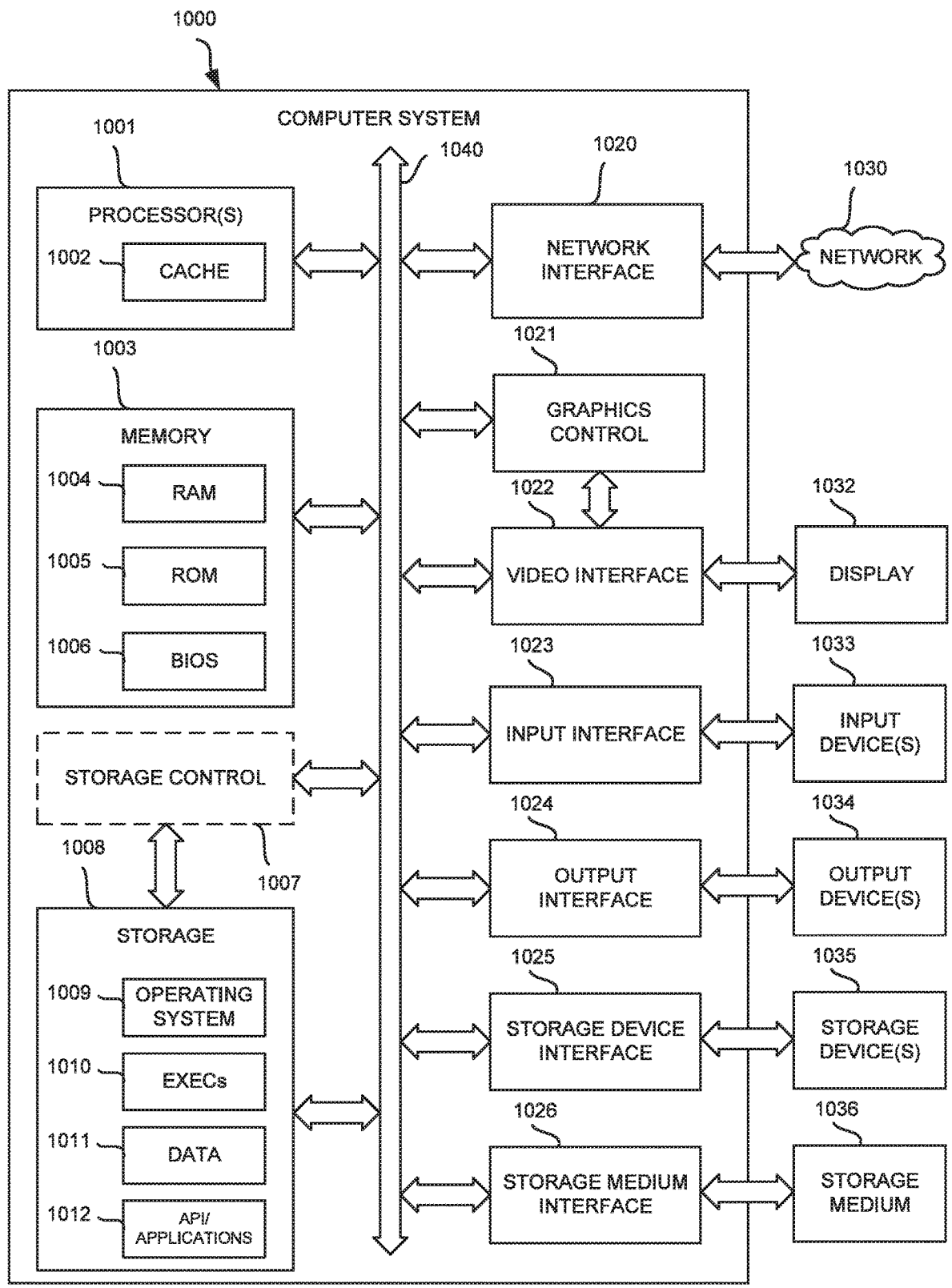
FIG. 10 is a block diagram depicting an exemplary machine that includes a computer system within which a set of instructions can be executed for causing a device to perform or execute any one or more of the aspects and/or methodologies of the present disclosure.

Referring to FIG. 10, it is a block diagram depicting an exemplary machine that includes a computer system 1000 within which a set of instructions can be executed, causing a device to perform or execute any one or more of the aspects and/or methodologies of the present disclosure. The components in FIG. 10 are examples only and do not limit the scope of use or functionality of any hardware, software, embedded logic component, or a combination of two or more such components implementing particular embodiments.

Computer system 1000 may include a processor 1001, a memory 1003, and a storage 1008 that communicate with each other, and with other components, via a bus 1040. The bus 1040 may also link a display 1032, one or more input devices 1033 (which may, for example, include a keypad, a keyboard, a mouse, a stylus, etc.), one or more output devices 1034, one or more storage devices 10310, and various tangible storage media 1036. All of these elements may interface directly or via one or more interfaces or adaptors to the bus 1040. For instance, the various tangible storage media 1036 can interface with the bus 1040 via storage medium interface 1026. Computer system 1000 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 1001 (or central processing unit(s) (CPU(s))) optionally contains a cache memory unit 1002 for temporary local storage of instructions, data, or computer addresses. Processor(s) 1001 are configured to assist in execution of computer readable instructions. Computer system 1000 may provide functionality for the components depicted in FIGS.

2-4 as a result of the processor(s) 1001 executing non-transitory, processor-executable instructions embodied in one or more tangible computer-readable storage media, such as memory 1003, storage 1008, storage devices 10310, and/or storage medium 1036. The computer-readable media may store software that implements particular embodiments, and processor(s) 1001 may execute the software. Memory 1003 may read the software from one or more other computer-readable media (such as mass storage device(s) 10310, 1036) or from one or more other sources through a suitable interface, such as network interface 1020. The software may cause processor(s) 1001 to carry out one or more processes or one or more steps of one or more processes described or illustrated herein. Carrying out such processes or steps may include defining data structures stored in memory 1003 and modifying the data structures as directed by the software.

The memory 1003 may include various components (e.g., machine readable media) including, but not limited to, a random-access memory component (e.g., RAM 1004) (e.g., a static RAM "SRAM", a dynamic RAM "DRAM, etc.), a read-only component (e.g., ROM 10010), and any combinations thereof. ROM 10010 may act to communicate data and instructions unidirectionally to processor(s) 1001, and RAM 1004 may act to communicate data and instructions bidirectionally with processor(s) 1001. ROM 10010 and RAM 1004 may include any suitable tangible computer-readable media described below. In one example, a basic input/output system 1006 (BIOS), including basic routines that help to transfer information between elements within computer system 1000, such as during start-up, may be stored in the memory 1003.

Fixed storage 1008 is connected bidirectionally to processor(s) 1001, optionally through storage control unit 1007. Fixed storage 1008 provides additional data storage capacity and may also include any suitable tangible computer-readable media described herein. Storage 1008 may be used to store operating system 1009, EXECs 1010 (executables), data 1011, API applications 1012 (application programs), and the like. Often, although not always, storage 1008 is a secondary storage medium (such as a hard disk) that is slower than primary storage (e.g., memory 1003). Storage 1008 can also include an optical disk drive, a solid-state memory device (e.g., flash-based systems), or a combination of any of the above. Information in storage 1008 may, in appropriate cases, be incorporated as virtual memory in memory 1003.

In one example, storage device(s) 10310 may be removably interfaced with computer system 1000 (e.g., via an external port connector (not shown)) via a storage device interface 10210. Particularly, storage device(s) 10310 and an associated machine-readable medium may provide nonvolatile and/or volatile storage of machine-readable instructions, data structures, program modules, and/or other data for the computer system 1000. In one example, software may reside, completely or partially, within a machine-readable medium on storage device(s) 10310. In another example, software may reside, completely or partially, within processor(s) 1001.

Bus 1040 connects a wide variety of subsystems. Herein, reference to a bus may encompass one or more digital signal lines serving a common function, where appropriate. Bus 1040 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1000 may also include an input device 1033. In one example, a user of computer system 1000 may enter commands and/or other information into computer system 1000 via input device(s) 1033. Examples of an input device(s) 1033 include, but are not limited to, an alphanumeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 1033 may be interfaced to bus 1040 via any of a variety of input interfaces 1023 (e.g., input interface 1023) including, but not limited to, serial, parallel, game port, USB, FIREWIRE, THUNDERBOLT, or any combination of the above.

In particular embodiments, when computer system 1000 is connected to network 1030, computer system 1000 may communicate with other devices, specifically mobile devices and enterprise systems, connected to network 1030. Communications to and from computer system 1000 may be sent through network interface 1020. For example, network interface 1020 may receive incoming communications (such as requests or responses from other devices) in the form of one or more packets (such as Internet Protocol (IP) packets) from network 1030, and computer system 1000 may store the incoming communications in memory 1003 for processing. Computer system 1000 may similarly store outgoing communications (such as requests or responses to other devices) in the form of one or more packets in memory 1003 and communicated to network 1030 from network interface 1020. Processor(s) 1001 may access these communication packets stored in memory 1003 for processing.

Examples of the network interface 1020 include, but are not limited to, a network interface card, a modem, and any combination thereof. Examples of a network 1030 or network segment 1030 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 1030, may employ a wired and/or a wireless mode of communication. In general, any network topology may be used.

Information and data can be displayed through a display 1032. Examples of a display 1032 include, but are not limited to, a liquid crystal display (LCD), an organic liquid crystal display (OLED), a cathode ray tube (CRT), a plasma display, and any combinations thereof. The display 1032 can interface to the processor(s) 1001, memory 1003, and fixed storage 1008, as well as other devices, such as input device(s) 1033, via the bus 1040. The display 1032 is linked to the bus 1040 via a video interface 1022, and transport of data between the display 1032 and the bus 1040 can be controlled via the graphics control 1021.

In addition to a display 1032, computer system 1000 may include one or more other peripheral output devices 1034 including, but not limited to, an audio speaker, a printer, and any combinations thereof. Such peripheral output devices may be connected to the bus 1040 via an output interface 1024. Examples of an output interface 1024 include, but are not limited to, a serial port, a parallel connection, a USB port, a FIREWIRE port, a THUNDERBOLT port, and any combinations thereof.

In addition, or as an alternative, computer system 1000 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A mobile inventory transportation communication network, the mobile inventory transportation communication network comprising:
   a mobile inventory transport unit (MITU) comprising:
   a housing,
   an inventory storage device, wherein the inventory storage device is physically coupled to the housing using one or more fasteners,
   a power device, wherein the power device is operationally configured to supply power to electrical components of the MITU and the inventory storage device, and is selected from a group consisting of a battery cell, fuel cell, and solar cell, and wherein the housing and the inventory storage device exchange data and power using one of resonant inductive coupling or a Near Field Communication (NFC) connection,
   a drive device, wherein the drive device is in electrical communication with the power device, and is operationally configured to physically move the MITU,
   a navigation device, wherein the navigation device is in electrical communication with the power device, and is operationally configured to transmit and receive geographic data and determine a physical location of the MITU, wherein determining the physical location of the MITU is based on one or more of Global Positioning System (GPS), Quick Response (QR) codes, Radio-Frequency Identification (RFID), and NFC;
   a sensing device, wherein the sensing device is in electrical communication with the power device, and is operationally configured to detect physical objects and transmit and receive physical object data, and
   a control device, wherein the control device is in electrical communication with the inventory storage device, the power device, the drive device, the navigation device, and the sensing device, and is operationally configured to control the MITU and transmit and receive data from physically separate systems and the inventory storage device;
   a transportation system, wherein the transportation system is operationally configured to transmit to and receive data from the MITU and other secondary systems, physically receive the MITU, wherein physically receiving the mobile inventory transport unit MITU is based on one or more of object recognition and identifying an RFID tag, a QR code, or a Bluetooth module associated with the MITU, and physically transport the MITU from a first point to a second point;
   a second central system, wherein the second central system is in communication with a first central system, the MITU, and the transportation system, and is operationally configured to determine an inventory demand at a second or more location, transmit inventory request data to the first central system, receive data from the first central system, transmit to and receive data from the transportation system, and transmit to and receive data from the MITU; and
   wherein the first central system is in communication with the control device of the MITU, transportation system, and the second central system, and is operationally configured to receive inventory request data from the second central system, transmit to and receive data from the second central system, transmit to and receive data from the MITU, schedule the movement of the MITU, transmit to and receive data from the transportation system, and control the delivery of the MITU to a final destination.

2. The mobile inventory transportation communication network of claim 1, wherein the first central system is at an origin location and the second central system is at the final destination, and wherein the MITU tracks the physical location in real-time and disembarks from the transportation system when the physical location matches the final destination.

3. The mobile inventory transportation communication network of claim 1, wherein the method of transmitting and receiving data of the navigation device is selected from a group consisting of GPS, Wi-Fi, and Cellular.

4. The mobile inventory transportation communication network of claim 1, wherein the method of detection of physical objects of the sensing device is selected from a group consisting of Light Detection and Ranging (LIDAR), Radar, Laser, ultrasonic, and Infrared sensing.

5. The mobile inventory transportation communication network of claim 1, wherein the method of transmitting and receiving data of the control device is selected from a list consisting of Wi-Fi, cellular, and Bluetooth, and wherein the housing and the inventory storage device bi-directionally exchange data and power using one of the resonant inductive coupling or the NFC connection.

6. The mobile inventory transportation communication network of claim 1, wherein the transportation system identifies a loading of the MITU on the transportation system based at least in part on analyzing a change in weight.

7. The mobile inventory transportation communication network of claim 1, wherein the method of transmitting and receiving MITU data, first central system data, and transportation system data of the second central system is selected from a group consisting of Wi-Fi, cellular, and Bluetooth.

8. The mobile inventory transportation communication network of claim 1, wherein the method of transmitting and receiving MITU data, second central system data, and transportation system data of the first central system is selected from a group consisting of Wi-Fi, cellular, and Bluetooth.

9. A system for transporting a mobile inventory transportation unit (MITU) in a mobile inventory transportation communication network, the system comprising:
one or more hardware processors configured by machine-readable instructions, the MITU comprising:
a housing,
an inventory storage device, wherein the inventory storage device is physically coupled to the housing using one or more fasteners,
a power device, wherein the power device is operationally configured to supply power to electrical components of the MITU and the inventory storage device, and is selected from a group consisting of a battery cell, fuel cell, and solar cell, and wherein the housing and the inventory storage device exchange data and power using one of resonant inductive coupling or a Near Field Communication (NFC) connection,
a drive device, wherein the drive device is in electrical communication with the power device, and is operationally configured to physically move the MITU,
a navigation device, wherein the navigation device is in electrical communication with the power device, and is operationally configured to transmit and receive geographic data and determine a physical location of the MITU, wherein determining the physical location of the MITU is based on one or more of Global Positioning System (GPS), Quick Response (QR) codes, Radio-Frequency Identification (RFID), and NFC,
a sensing device, wherein the sensing device is in electrical communication with the power device, and is operationally configured to detect physical objects and transmit and receive physical object data, and
a control device, wherein the control device is in electrical communication with the inventory storage device, the power device, the drive device, the navigation device, and the sensing device, and is operationally configured to control the MITU and transmit and receive data from physically separate systems and the inventory storage device;
a transportation system, wherein the transportation system is operationally configured to transmit to and receive data from the MITU and other secondary systems, physically receive the MITU, wherein physically receiving the MITU is based on one or more of object recognition and identifying an RFID tag, QR code, or Bluetooth module associated with the MITU, and physically transport the MITU from a first point to a second point;
a second central system, wherein the second central system is in communication with a first central system, the MITU, and the transportation system, and is operationally configured to determine an inventory demand at a second or more location, transmit inventory request data to the first central system, receive data from the first central system, transmit to and receive data from the transportation system, and transmit to and receive data from the MITU; and
wherein the first central system is in communication with the control device of the MITU, transportation system, and the second central system, and is operationally configured to receive inventory request data from the second central system, transmit to and receive data from the second central system, transmit to and receive data from the MITU, schedule the movement of the MITU, transmit to and receive data from the transportation system, and control the delivery of the MITU to a final destination.

10. The system of claim 9, wherein the first central system is at an origin location and the second central system is at the final destination, and wherein the MITU tracks the physical location in real-time and disembarks from the transportation system when the physical location matches the final destination.

11. The system of claim 9, wherein the method of transmitting and receiving data of the navigation device is selected from a group consisting of GPS, Wi-Fi, and Cellular.

12. The system of claim 9, wherein the method of detection of physical objects of the sensing device is selected from a group consisting of Light Detection and Ranging (LIDAR), Radar, Laser, ultrasonic, and Infrared sensing.

13. The system of claim 9, wherein the method of transmitting and receiving data of the control device is selected from a list consisting of Wi-Fi, cellular, and Bluetooth.

14. The system of claim 9, wherein the transportation system identifies a loading of the MITU on the transportation system based at least in part on analyzing a change in weight.

15. The system of claim 9, wherein the method of transmitting and receiving MITU data, first central system data, and transportation system data of the second central system is selected from a group consisting of Wi-Fi, cellular, and Bluetooth.

16. The system of claim 9, wherein the method of transmitting and receiving MITU data, second central system data, and transportation system data of the first central system is selected from a group consisting of Wi-Fi, cellular, and Bluetooth.

17. The system of claim 9, wherein at least one of the housing and the inventory storage device comprises a climate-controlled portion, and wherein the climate-controlled portion is electrically connected to the power device.

18. The system of claim 9, wherein the MITU further comprises:
a balance device for supplying weight distribution of the MITU, wherein the balance device is in communication with the drive device and the control device, and wherein the balance device comprises one or more of a gyroscope and an accelerometer.

19. The system of claim 9, wherein the inventory storage device is configured to rotate relative to the housing.

20. A non-transitory, tangible computer readable storage medium, encoded with processor readable instructions to perform a method for transporting a mobile inventory transportation unit (MITU) in a mobile inventory transportation communication network, the mobile inventory transportation communication network comprising the MITU, a transportation system, a first and a second central system, the MITU comprising:
- a housing,
- an inventory storage device, wherein the inventory storage device is physically coupled to the housing,
- a power device, wherein the power device is operationally configured to supply power to electrical components of the MITU and the inventory storage device, and is selected from a group consisting of a battery cell, fuel cell, and solar cell, and wherein the housing and the inventory storage device exchange data and power using one of resonant inductive coupling or a Near Field Communication (NFC) connection,
- a drive device, wherein the drive device is in electrical communication with the power device, and is operationally configured to physically move the MITU,
- a navigation device, wherein the navigation device is in electrical communication with the power device, and is operationally configured to transmit and receive geographic data and determine a physical location of the MITU, wherein determining the physical location of the MITU is based on one or more of Global Positioning System (GPS), Quick Response (QR) codes, Radio-Frequency Identification (RFID), and NFC,
- a sensing device, wherein the sensing device is in electrical communication with the power device, and is operationally configured to detect physical objects and transmit and receive physical object data, and
- a control device, wherein the control device is in electrical communication with the inventory storage device, the power device, the drive device, the navigation device, and the sensing device, and is operationally configured to control the MITU and transmit and receive data from physically separate systems and the inventory storage device;

the method comprising:
- configuring a transportation system to transmit to and receive data from the MITU and other secondary systems, physically receive the MITU, wherein physically receiving the MITU is based on one or more of object recognition and identifying an RFID tag, QR code, or Bluetooth module associated with the MITU, and physically transport the MITU from a first point to a second point;
- configuring the second central system to determine an inventory demand at a second or more location, transmit inventory request data to the first central system, receive data from the first central system, transmit to and receive data from the transportation system, and transmit to and receive data from the MITU, wherein the second central system is in communication with the first central system, the MITU, and the transportation system; and
- configuring the first central system to receive data from the second central system, transmit to and receive data from the MITU, schedule the movement of the MITU, transmit to and receive data from the transportation system, and control the delivery of the MITU to a final destination, wherein the first central system is in communication with the control device of the MITU, transportation system, and the second central system, and is operationally configured to receive inventory request data from the second central system.

21. The non-transitory, tangible computer readable storage medium of claim 20, wherein the first central system is at an origin location and the second central system is at the final destination, and wherein the MITU tracks the physical location in real-time and disembarks from the transportation system when the physical location matches the final destination.

22. The non-transitory, tangible computer readable storage medium of claim 20, wherein the method of transmitting and receiving data of the navigation device is selected from a group consisting of GPS, Wi-Fi, and Cellular.

23. The non-transitory, tangible computer readable storage medium of claim 20, wherein the method of detection of physical objects of the sensing device is selected from a group consisting of Light Detection and Ranging (LIDAR), Radar, Laser, ultrasonic, and Infrared sensing.

24. The non-transitory, tangible computer readable storage medium of claim 20, wherein the method of transmitting and receiving data of the control device is selected from a list consisting of Wi-Fi, cellular, and Bluetooth, and wherein the housing and the inventory storage device bi-directionally exchange data and power using one of the resonant inductive coupling or the NFC connection.

25. The non-transitory, tangible computer readable storage medium of claim 20, wherein the transportation system identifies a loading of the MITU on the transportation system based at least in part on analyzing a change in weight.

26. The non-transitory, tangible computer readable storage medium of claim 20, wherein the method of transmitting and receiving MITU data, first central system data, and transportation system data of the second central system is selected from a group consisting of Wi-Fi, cellular, and Bluetooth.

27. The non-transitory, tangible computer readable storage medium of claim 20, wherein the method of transmitting and receiving MITU data, second central system data, and transportation system data of the first central system is selected from a group consisting of Wi-Fi, cellular, and Bluetooth.

28. A method for transporting a mobile inventory transportation unit (MITU) in a mobile inventory transportation communication network, the mobile inventory transportation communication network comprising the MITU, a transportation system, a first and a second central system, the MITU comprising:
- a housing,
- an inventory storage device, wherein the inventory storage device is physically coupled to the housing using one or more fasteners,
- a power device, wherein the power device is operationally configured to supply power to electrical components of the MITU and the inventory storage device, and is selected from a group consisting of a battery cell, fuel cell, and solar cell, and wherein the housing and the inventory storage device exchange data and power using one of resonant inductive coupling or a Near Field Communication (NFC) connection,
- a drive device, wherein the drive device is in electrical communication with the power device, and is operationally configured to physically move the MITU,
- a navigation device, wherein the navigation device is in electrical communication with the power device, and is operationally configured to transmit and receive geographic data and determine a physical location of the MITU, wherein determining the physical location of the MITU is based on one or more of Global Positioning System (GPS), Quick Response (QR) codes, Radio-Frequency Identification (RFID), and NFC, a sensing device, wherein the sensing device is in electrical communication with the power device, and is operationally configured to detect physical objects and transmit and receive physical object data, and a control device, wherein the control device is in electrical communication with the inventory storage device, the power device, the drive device, the navigation device, and the sensing device, and is operationally configured to control the MITU and transmit and receive data from physically separate systems and the inventory storage device;

the method comprising:

configuring a transportation system to transmit to and receive data from the MITU and other secondary systems, physically receive the MITU, and physically transport the MITU from a first point to a second point;

configuring the second central system to determine an inventory demand at a second or more location, transmit inventory request data to the first central system, receive data from the first central system, transmit to and receive data from the transportation system, and transmit to and receive data from the MITU, wherein the second central system is in communication with the first central system, the MITU, and the transportation system; and configuring the first central system to receive data from the second central system, transmit to and receive data from the MITU, schedule the movement of the MITU, transmit to and receive data from the transportation system, and control the delivery of the MITU to a final destination, wherein the first central system is in communication with the control device of the MITU, transportation system, and the second central system, and is operationally configured to receive inventory request data from the second central system.

* * * * *